United States Patent
Baghel et al.

(10) Patent No.: US 11,006,256 B2
(45) Date of Patent: May 11, 2021

(54) SIDELINK LINK ADAPTATION FEEDBACK

(71) Applicant: QUALCOMM Incorporated, San Diego, CA (US)

(72) Inventors: Sudhir Kumar Baghel, Hillsborough, NJ (US); Arjun Bharadwaj, Poway, CA (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 16/656,136

(22) Filed: Oct. 17, 2019

(65) Prior Publication Data

US 2020/0145799 A1 May 7, 2020

Related U.S. Application Data

(60) Provisional application No. 62/754,567, filed on Nov. 1, 2018.

(51) Int. Cl.
*H04W 4/40* (2018.01)
*H04W 28/02* (2009.01)
*H04L 5/00* (2006.01)
*H04L 1/00* (2006.01)
(Continued)

(52) U.S. Cl.
CPC ............. *H04W 4/40* (2018.02); *H04L 1/0003* (2013.01); *H04L 1/1819* (2013.01); *H04L 5/0055* (2013.01); *H04W 28/0247* (2013.01); *H04W 92/18* (2013.01)

(58) Field of Classification Search
None
See application file for complete search history.

(56) References Cited

U.S. PATENT DOCUMENTS

2015/0124786 A1  5/2015 Asterjadhi et al.
2018/0035427 A1  2/2018 Gupta et al.
2019/0364402 A1* 11/2019 Lee ..................... H04W 84/005

FOREIGN PATENT DOCUMENTS

WO  WO-2018111498 A1  6/2018
WO  WO-2020069291 A1 * 4/2020 .............. H04W 4/40

OTHER PUBLICATIONS

International Search Report and Written Opinion—PCT/US2019/056963—ISA/EPO—dated Jan. 22, 2020.

* cited by examiner

*Primary Examiner* — Anh Ngoc M Nguyen
(74) *Attorney, Agent, or Firm* — Holland & Hart LLP

(57) ABSTRACT

The described techniques may allow transmitting devices to adjust transmission parameters (e.g., transmit power, modulation and coding scheme (MCS)), until reaching an optimal power and/or MCS. These techniques may allow devices to use power efficiently and reduce inter-device interference in a vehicle-to-everything sidelink system. For example, a transmitting device may begin transmissions to a receiving device with initial transmission parameters, which may be configured using a transmission priority and a channel busy ratio. The transmitting device may lower power and/or increase MCS in each of its subsequent transmissions of the same priority, until the receiving device transmits a feedback message that indicates a low signal quality or a failure to decode a previous transmission. The transmitting device may then increase its transmit power and/or decrease its MCS to an acceptable level for a specified time duration based on receiving the feedback message.

30 Claims, 15 Drawing Sheets

(51) Int. Cl.
*H04L 1/18* (2006.01)
*H04W 92/18* (2009.01)

SIDELINK LINK ADAPTATION FEEDBACK

CROSS REFERENCE

The present application for patent claims the benefit of U.S. Provisional Patent Application No. 62/754,567 by BAGHEL et al., entitled "SIDELINK LINK ADAPTATION FEEDBACK," filed Nov. 1, 2018, assigned to the assignee hereof, and expressly incorporated herein.

BACKGROUND

The following relates generally to wireless communications, and more specifically to sidelink link adaptation feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may transmit and receive messages within a vehicle-to-everything (V2X) sidelink network. For example, the UE may communicate with multiple other UEs or other wireless devices concurrently. Accordingly, the UE may receive multiple transmissions from the multiple other UEs and wireless devices at a given instance of time. In some cases, these transmissions (e.g., both intended for the UE and not intended for the UE) may cause interference at the UE, hindering the ability of the UE to correctly or efficiently receive and decode any transmissions intended for it. Additionally, collisions may occur between one or more of the multiple other UEs and wireless devices based on attempting to access a same set of resources for communication in the V2X sidelink network. Such interferences and collisions may negatively affect the accuracy of correctly receiving or sending transmissions at the UE.

SUMMARY

The described techniques relate to improved methods, systems, devices, and apparatuses that support sidelink link adaptation feedback. Generally, the described techniques provide for enabling one or more user equipments (UEs) to avoid interference and collisions in a vehicle-to-everything (V2X) sidelink network. For example, a first UE may transmit a first data packet using an initial configured transmission power level and/or modulation and coding scheme (MCS) (e.g., a first set of transmission parameters). As such, the first UE may transmit the first data packet to a second UE via a sidelink connection. The first UE may transmit this first data packet at the initial configured power level and MCS and then adjust either or both of the transmission power and the MCS for a subsequent data packet transmission (e.g., for a second data packet), where the adjustment is made according to a configured step. In some examples, the initial configured transmission power level/MCS and the configured step may be a function of a channel busy ratio (CBR) and/or a quality of service (e.g., a priority) for the first data packet. The first UE may continue to adjust the transmission power and/or the MCS of a previously transmitted data packet for a subsequent data packet by the configured step until a feedback message is received from the second UE.

In some cases, the second UE may be configured with a threshold of a signal quality (e.g., signal to interference plus noise ratio (SINR) or reference signal received power (RSRP)), where the second UE measures the signal quality for a received data packet transmission and compares the measurement to the threshold. If the measurement falls below the threshold and remains there for a configured amount of time, the second UE may transmit a feedback message to the first UE to indicate a need to increase the transmission power level and/or decrease the MCS of the previously received data packet. In some cases, the configured threshold and the configured amount of time may depend on the CBR and the quality of service for the first data packet transmission. Additionally or alternatively, the feedback message may indicate a hybrid automatic repeat request (HARM) negative acknowledgement (NACK) feedback message that indicates for the first UE to use a previous transmission power and/or MCS for a configured time duration. Upon receiving the feedback message from the second UE (e.g., the measurement falling below the threshold or the HARQ NACK), the first UE may increase its transmit power and/or reduce its MCS to transmit subsequent data packets for a specified time duration at the increased transmission power and/or reduced MCS.

A method of wireless communications at a transmitting device is described. The method may include transmitting, via a V2X sidelink communications, a first data packet in accordance with a first set of transmission parameters and a first quality of service (QoS), adjusting the first set of transmission parameters according to a preconfigured amount, and transmitting, via the V2X sidelink communications, a second data packet in accordance with the adjusted first set of transmission parameters and the first QoS.

An apparatus for wireless communications at a transmitting device is described. The apparatus may include a processor, memory in electronic communication with the processor, and instructions stored in the memory. The instructions may be executable by the processor to cause the apparatus to transmit, via a V2X sidelink communications, a first data packet in accordance with a first set of transmission parameters and a first QoS, adjust the first set of transmission parameters according to a preconfigured amount, and transmit, via the V2X sidelink communications, a second data packet in accordance with the adjusted first set of transmission parameters and the first QoS.

Another apparatus for wireless communications at a transmitting device is described. The apparatus may include means for transmitting, via a V2X sidelink communications, a first data packet in accordance with a first set of transmission parameters and a first QoS, adjusting the first set of transmission parameters according to a preconfigured amount, and transmitting, via the V2X sidelink communications, a second data packet in accordance with the adjusted first set of transmission parameters and the first QoS.

A non-transitory computer-readable medium storing code for wireless communications at a transmitting device is described. The code may include instructions executable by a processor to transmit, via a V2X sidelink communications, a first data packet in accordance with a first set of transmission parameters and a first QoS, adjust the first set of transmission parameters according to a preconfigured amount, and transmit, via the V2X sidelink communications, a second data packet in accordance with the adjusted first set of transmission parameters and the first QoS.

Some examples of the method, apparatuses, and non-transitory computer-readable medium described herein may further include operations, features, means, or instructions for receiving, via the V2X sidelink communications, a feedback message for the second data packet, and transmitting, via the V2X sidelink communications, one or more third data packets in accordance with a third set of transmission parameters different than the adjusted first set of transmission parameters based on the received feedback message, where the one or more third data packets may be transmitted according to the first QoS.

In some examples of the method, apparatuses, and non-transitory computer-readable medium described herein, receiving the feedback message may include operations, features, means, or instructions for receiving, via the V2X sidelink communications, a link adaptation feedback message indicating a measured signal quality of the second data packet may be below a threshold value.

In some examples of the method, apparatuses, and non-transitory computer-readable medium described herein, the measured signal quality may be a SINR or a RSRP measurement.

In some examples of the method, apparatuses, and non-transitory computer-readable medium described herein, the threshold value may be based on one or more of the first QoS or a CBR for the first data packet.

In some examples of the method, apparatuses, and non-transitory computer-readable medium described herein, receiving the feedback message may include operations, features, means, or instructions for receiving, via the V2X sidelink communications, a HARQ NACK feedback message.

Some examples of the method, apparatuses, and non-transitory computer-readable medium described herein may further include operations, features, means, or instructions for transmitting, via the V2X sidelink communications, the one or more third data packets in accordance with the third set of transmission parameters for a configured time duration, where the third set of transmission parameters include one or more same transmission parameters as the first set of transmission parameters.

In some examples of the method, apparatuses, and non-transitory computer-readable medium described herein, the configured time duration may be based on one or more of the first QoS or a CBR for the first data packet.

Some examples of the method, apparatuses, and non-transitory computer-readable medium described herein may further include operations, features, means, or instructions for transmitting, via the V2X sidelink communications, an additional data packet in accordance with the first set of transmission parameters after the configured time duration ends.

In some examples of the method, apparatuses, and non-transitory computer-readable medium described herein, the third set of transmission parameters include a set of parameters indicated by the feedback message with one or more of a higher transmission power than the adjusted first set of transmission parameters or a lower MCS than the adjusted first set of transmission parameters.

In some examples of the method, apparatuses, and non-transitory computer-readable medium described herein, the third set of transmission parameters may be a same set of parameters as the first set of transmission parameters.

Some examples of the method, apparatuses, and non-transitory computer-readable medium described herein may further include operations, features, means, or instructions for receiving, via the V2X sidelink communications, a feedback message for the second data packet, maintaining a set of transmission parameters for a period of time based on receiving the feedback message; and, and transmitting subsequent data packets at the maintained set of transmission parameters for the period of time.

In some examples of the method, apparatuses, and non-transitory computer-readable medium described herein, maintaining the set of transmission parameters may include operations, features, means, or instructions for suspending adjustment of transmission parameters for the period of time.

In some examples of the method, apparatuses, and non-transitory computer-readable medium described herein, the set of transmission parameters may be maintained above one or more of the first set of transmission parameters or the adjusted first set of transmission parameters.

In some examples of the method, apparatuses, and non-transitory computer-readable medium described herein, adjusting the first set of transmission parameters may include operations, features, means, or instructions for reducing a transmission power of the first set of transmission parameters by the preconfigured amount.

In some examples of the method, apparatuses, and non-transitory computer-readable medium described herein, adjusting the first set of transmission parameters may include operations, features, means, or instructions for increasing a MCS of the first set of transmission parameters by the preconfigured amount.

In some examples of the method, apparatuses, and non-transitory computer-readable medium described herein, the first set of transmission parameters and the preconfigured amount may be based on one or more of the first QoS or a CBR for the first data packet.

In some examples of the method, apparatuses, and non-transitory computer-readable medium described herein, the first set of transmission parameters may be configured by higher layer signaling.

In some examples of the method, apparatuses, and non-transitory computer-readable medium described herein, the first QoS includes a first priority level for the first data packet.

A method of wireless communications at a receiving device is described. The method may include receiving, via a V2X sidelink communications, a first data packet in accordance with a first set of transmission parameters and a first QoS, measuring a first signal quality for the first data packet, comparing the first signal quality to a configured threshold value, and receiving, via the V2X sidelink communications, a second data packet in accordance with a second set of transmission parameters based at least in part the measured first signal quality, where the second data packet is received according to the first QoS.

An apparatus for wireless communications at a receiving device is described. The apparatus may include a processor, memory in electronic communication with the processor, and instructions stored in the memory. The instructions may be executable by the processor to cause the apparatus to receive, via a V2X sidelink communications, a first data packet in accordance with a first set of transmission parameters and a first QoS, measure a first signal quality for the first data packet, compare the first signal quality to a configured threshold value, and receive, via the V2X sidelink communications, a second data packet in accordance with a second set of transmission parameters based at least in part the measured first signal quality, where the second data packet is received according to the first QoS.

Another apparatus for wireless communications at a receiving device is described. The apparatus may include means for receiving, via a V2X sidelink communications, a first data packet in accordance with a first set of transmission parameters and a first QoS, measuring a first signal quality for the first data packet, comparing the first signal quality to a configured threshold value, and receiving, via the V2X sidelink communications, a second data packet in accordance with a second set of transmission parameters based at least in part the measured first signal quality, where the second data packet is received according to the first QoS.

A non-transitory computer-readable medium storing code for wireless communications at a receiving device is described. The code may include instructions executable by a processor to receive, via a V2X sidelink communications, a first data packet in accordance with a first set of transmission parameters and a first QoS, measure a first signal quality for the first data packet, compare the first signal quality to a configured threshold value, and receive, via the V2X sidelink communications, a second data packet in accordance with a second set of transmission parameters based at least in part the measured first signal quality, where the second data packet is received according to the first QoS.

Some examples of the method, apparatuses, and non-transitory computer-readable medium described herein may further include operations, features, means, or instructions for measuring a second signal quality for the second data packet, comparing the second signal quality to the configured threshold value, transmitting, via the V2X sidelink communications, a link adaptation feedback message based on the second signal quality for the second data packet being below the configured threshold value, and receiving, via the V2X sidelink communications, one or more third data packets in accordance with a third set of transmission parameters different than the second set of transmission parameters based on transmitting the link adaptation feedback message, where the second data packet may be received according to the first QoS.

In some examples of the method, apparatuses, and non-transitory computer-readable medium described herein, the link adaptation feedback message includes an indication for a transmitting device to adjust the second set of transmission parameters for transmitting the one or more third data packets in accordance with the third set of transmission parameters.

Some examples of the method, apparatuses, and non-transitory computer-readable medium described herein may further include operations, features, means, or instructions for indicating, in the link adaptation feedback message, an increase in a transmission power from the second set of transmission parameters to the third set of transmission parameters for transmitting the one or more third data packets.

Some examples of the method, apparatuses, and non-transitory computer-readable medium described herein may further include operations, features, means, or instructions for indicating, in the link adaptation feedback message, a decrease in a MCS from the second set of transmission parameters to the third set of transmission parameters for transmitting the one or more third data packets.

In some examples of the method, apparatuses, and non-transitory computer-readable medium described herein, measuring the second signal quality for the second data packet further may include operations, features, means, or instructions for determining that the second signal quality for the second data packet may be below the configured threshold value for a configured time duration.

In some examples of the method, apparatuses, and non-transitory computer-readable medium described herein, the configured time duration may be based on one or more of the first QoS or a CBR for the first data packet.

In some examples of the method, apparatuses, and non-transitory computer-readable medium described herein, the threshold value may be based on one or more of the first QoS or a CBR for the first data packet.

Some examples of the method, apparatuses, and non-transitory computer-readable medium described herein may further include operations, features, means, or instructions for measuring a second signal quality for the second data packet, comparing the second signal quality to the configured threshold value, and transmitting, via the V2X sidelink communications, a link adaptation feedback message based on the second signal quality for the second data packet being below the configured threshold value, where the link adaptation feedback message includes an indication to suspend adjustments of transmission parameters for a period of time.

In some examples of the method, apparatuses, and non-transitory computer-readable medium described herein, the second set of transmission parameters includes one or more of a lower transmission power or a higher MCS than the first set of transmission parameters.

In some examples of the method, apparatuses, and non-transitory computer-readable medium described herein, the measured signal quality includes a SINR or a RSRP measurement.

In some examples of the method, apparatuses, and non-transitory computer-readable medium described herein, the measured signal quality includes an instantaneous measurement or a filtered value for a time window.

In some examples of the method, apparatuses, and non-transitory computer-readable medium described herein, the first QoS includes a first priority level for the first data packet.

A method of wireless communications at a receiving device is described. The method may include receiving, via a V2X sidelink communications, a first data packet in accordance with a first set of transmission parameters and a first QoS, decoding the first data packet, and receiving, via the V2X sidelink communications, a second data packet in accordance with a second set of transmission parameters based on the decoded first data packet, where the second data packet is received according to the first QoS.

An apparatus for wireless communications at a receiving device is described. The apparatus may include a processor, memory in electronic communication with the processor, and instructions stored in the memory. The instructions may be executable by the processor to cause the apparatus to receive, via a V2X sidelink communications, a first data packet in accordance with a first set of transmission parameters and a first QoS, decode the first data packet, and receive, via the V2X sidelink communications, a second data packet in accordance with a second set of transmission parameters based on the decoded first data packet, where the second data packet is received according to the first QoS.

Another apparatus for wireless communications at a receiving device is described. The apparatus may include means for receiving, via a V2X sidelink communications, a first data packet in accordance with a first set of transmission parameters and a first QoS, decoding the first data packet, and receiving, via the V2X sidelink communications, a second data packet in accordance with a second set of transmission parameters based on the decoded first data packet, where the second data packet is received according to the first QoS.

A non-transitory computer-readable medium storing code for wireless communications at a receiving device is described. The code may include instructions executable by a processor to receive, via a V2X sidelink communications, a first data packet in accordance with a first set of transmission parameters and a first QoS, decode the first data packet, and receive, via the V2X sidelink communications, a second data packet in accordance with a second set of transmission parameters based on the decoded first data packet, where the second data packet is received according to the first QoS.

Some examples of the method, apparatuses, and non-transitory computer-readable medium described herein may further include operations, features, means, or instructions for transmitting, via the V2X sidelink communications, a HARQ NACK feedback message based on failing to decode the second data packet, and receiving, via the V2X sidelink communications, one or more third data packets in accordance with a third set of transmission parameters different than the second data packet based on transmitting the HARQ negative acknowledgement feedback message, where the one or more third data packets may be transmitted according to the first QoS.

In some examples of the method, apparatuses, and non-transitory computer-readable medium described herein, transmitting the HARQ negative acknowledgement feedback message further may include operations, features, means, or instructions for transmitting an indication that a transmitting UE may be to transmit the one or more third data packets in accordance with the third set of transmission parameters for a configured time duration.

In some examples of the method, apparatuses, and non-transitory computer-readable medium described herein, the configured time duration may be based on one or more of the first QoS or a CBR for the first data packet.

Some examples of the method, apparatuses, and non-transitory computer-readable medium described herein may further include operations, features, means, or instructions for transmitting, via the V2X sidelink communications, a HARQ NACK feedback message based on failing to decode the second data packet, where the HARQ negative acknowledgement feedback message includes an indication to suspend adjustments of transmission parameters for a period of time.

In some examples of the method, apparatuses, and non-transitory computer-readable medium described herein, the second set of transmission parameters includes one or more of a lower transmission power or a higher MCS than the first set of transmission parameters.

In some examples of the method, apparatuses, and non-transitory computer-readable medium described herein, the first QoS includes a first priority level for the first data packet.

DETAILED DESCRIPTION

Figure 1:
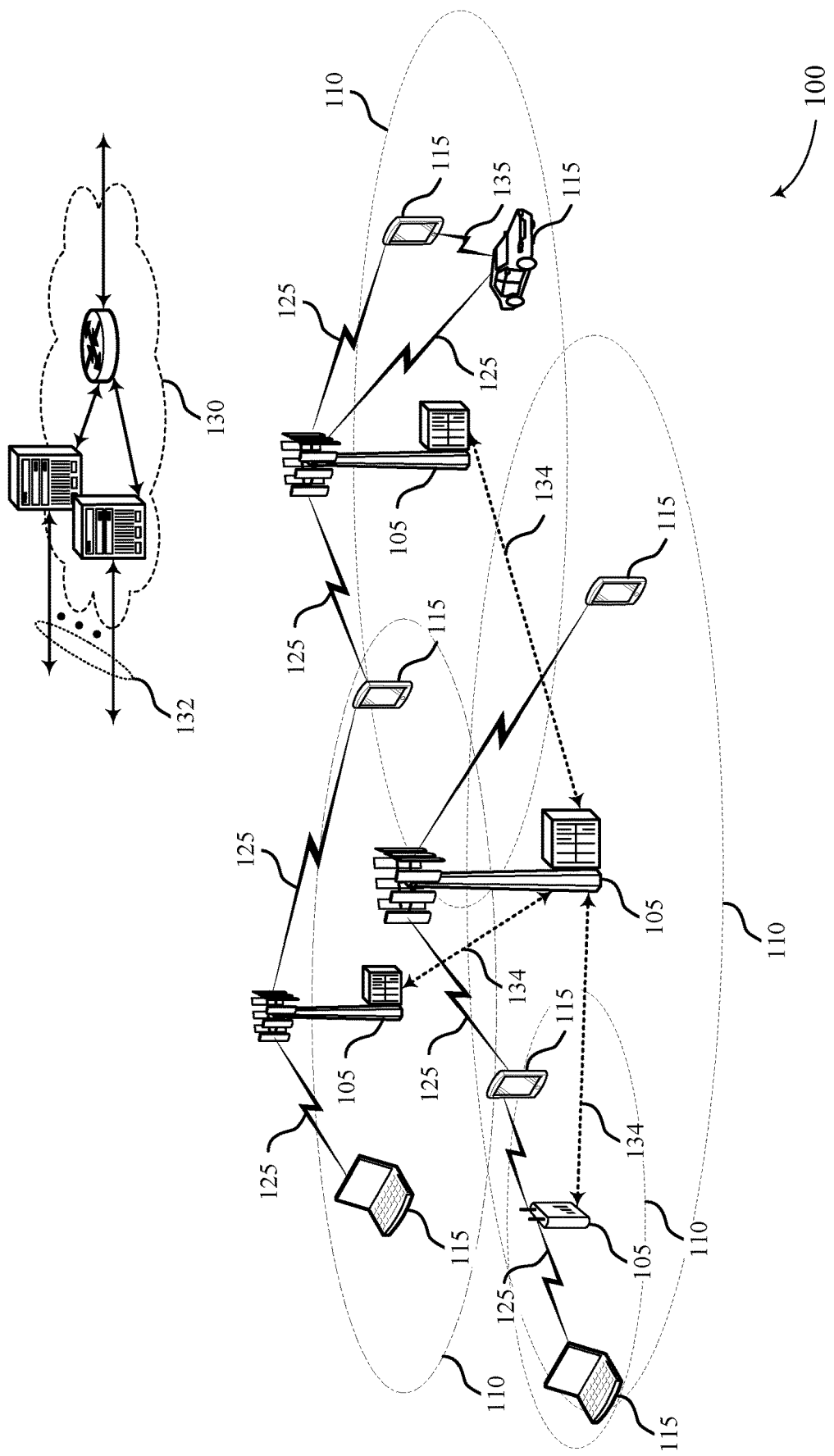
FIG. 1 illustrates an example of a system for wireless communications that supports sidelink link adaptation feedback in accordance with aspects of the present disclosure.

In some wireless communications systems (e.g., a fifth generation (5G) new radio (NR) wireless network), one or more wireless devices may communicate directly with each other using sidelink communications (e.g., without transmitting via a base station). For example, vehicles and other wireless devices (e.g., user equipment (UEs), sensors, etc.) may communicate with each other in a vehicle-to-everything (V2X) communication network to exchange important information (e.g., for autonomous vehicle operations). However, V2X sidelink communications may experience interference and collisions when using typical channel access mechanisms and when multiple wireless devices are attempting to use the same set of resources for the sidelink communications. Additionally, a certain quality of service (QoS) profile may be guaranteed to V2X devices within a corresponding communication range (e.g., a QoS profile communication range). The communication range may ensure that receiving devices can reliably receive data packets within this range.

Accordingly, a V2X link adaptation scheme (e.g., via feedback) may be used to ensure that devices in the communication range can receive packets reliably. Additionally, the V2X link adaptation scheme may decrease the amount of signaling interference inherent in sidelink systems. In some cases, the V2X link adaptation scheme may impact signal reception at wireless devices in the system by allowing signals to be received at an efficient power level, while still meeting QoS requirements indicated for the QoS profile communication range.

The V2X link adaptation scheme may include a transmitting device (e.g., a first UE, a transmitting vehicle, etc.) that begins transmitting a first data packet to a receiving device (e.g., a second UE, a receiving vehicle, a receiving sensor, etc.) using a first set of transmission parameters. In some cases, the first set of transmission parameters may include an initial power and/or modulation and coding scheme (MCS), which may be configured using a transmission priority level (e.g., as indicated in a QoS for the first data packet) and a channel busy ratio (CBR) for the first data packet. For subsequent data packets that are transmitted with the same transmission priority level and/or CBR as the first data packet, the transmitting device may lower power and/or increase MCS in each of the subsequent transmissions by a configured step amount until the receiving device transmits a feedback message specifying that a measured signal quality (e.g., signal to interference plus noise ratio (SINR), reference signal received power (RSRP)) has fallen below a certain threshold for a certain time period (e.g., via a link adaptation feedback message) or that a previously received data packet was not decoded properly (e.g., via a hybrid access request (HARQ) negative acknowledgement (NACK) feedback message). In some cases, the threshold and the time period may be based on the transmission priority level and/or a measured CBR.

After receiving the feedback message, the transmitting device may increase its transmit power and/or decrease its MCS to a level for a specified time duration that enables the receiving device to receive and/or decode the subsequent data packets. This process may be repeated in subsequent transmissions, as well as being repeated simultaneously in transmissions with different priority levels, allowing each transmitting device to fine-tune each data transmission to the point where it minimizes power use and interference, while still reaching the receiving device at a quality that enables reception and/or decoding of the subsequent transmissions.

Aspects of the disclosure are initially described in the context of a wireless communications system. An additional wireless communications system and examples of a power configuration scheme and process flow are then provided to illustrate additional aspects of the disclosure. Aspects of the disclosure are further illustrated by and described with reference to apparatus diagrams, system diagrams, and flowcharts that relate to interference avoidance using sidelink link adaption feedback.

FIG. 1 illustrates an example of a wireless communications system 100 that supports sidelink link adaptation feedback in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, or ProSe direct communications). Sidelink communications may be used for D2D media-sharing, vehicle-to-vehicle (V2V) communication, V2X communication (or cellular V2X (cV2X) communication), emergency rescue applications, etc. One or more of a group of UEs 115 utilizing sidelink communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via sidelink communications may utilize a one-to-many (1:M) system in which each UE 115 transmits to every other UE 115 in the group. In some cases (e.g., a centralized system), a base station 105 may facilitate the scheduling of resources for sidelink communications. In other cases (e.g., a distributed system), UEs 115 may carry out sidelink communications without the involvement of a base station 105.

In some examples of a distributed system, UEs 115 may choose transmission resources based on an algorithm (e.g., based on a distributed channel access mechanism) and make a transmission based on the algorithm results. In some distributed systems, a UE 115 may also calculate a CBR to indicate how much of the spectrum or system is loaded. In some examples, a CBR may be the ratio of occupied resources (e.g., resources with energy above a certain threshold) to the whole spectrum. In some instances, the CBR may give a reasonable indication of how occupied the channel is. In some distributed systems, a sidelink transmission from a UE 115 may consist of control information and data. The control information may include information required to decode sidelink data (e.g., start of an RB, length of the resource allocation, number of resource slots allocated, MCS, etc.), a link identification (ID) or destination ID (e.g., either complete or partial IDs) of an intended receiving UE 115, a source ID of a transmitting UE 115, etc. In some cases, a UE 115 may be able to decode control information but not be able to decode transmitted data (e.g., since control information may be more robust). In such cases, a transmitting UE 115 may send the entire destination ID and source ID in a medium access control (MAC) header and send a subset of the destination ID bits in the control information to enable feedback transmission when a receiving UE 115 may not be able to decode transmitted data. In some cases, there may be a tradeoff between the amount of channel interference and the amount of control overhead used.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen before talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125 or a sidelink 135. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some examples, a transmitting device (e.g., base station 105, UE 115) may indicate a HARQ configuration to a receiving device (e.g., UE 115) using control signaling. Additionally, negative HARQ feedback (e.g., HARQ feedback indicating an error) may be referred to as a NACK.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support one or more access mechanisms in a distributed channel (e.g., distributed sidelink communications) for accessing time and frequency resources for sidelink communications. For example, these distributed channel access mechanisms may include a random resource selection, a LBT-based resource selection, a request-response (REQ-RESP) based resource selection with transmission-reception yielding, a long-term-sensing based resource selection, etc. In some cases, the resource overhead for the purpose of channel contention may be a function of the channel access mechanism. In some systems with a distributed channel access mechanism, collisions among transmitters may be unavoidable. Additionally, the probability of transmission collisions (e.g., spatial reuse of resources) may depend on the channel access mechanism.

In one example of a distributed channel access mechanism, a UE 115 may use random resource selection to select a set of time-frequency resources in a distributed (e.g., random) manner. In some cases, random resource selection may result in the highest collision probability for transmissions, compared to other channel access mechanisms, while not increasing the resource overhead for channel contention. In another example of a distributed channel access mechanism, a UE 115 may use LBT-based resource selection, which may create guard zones around the transmitters. In some examples, the probability of collision for LBT-based resource selection may be smaller (e.g., on average) than for random selection. However, the probability of collisions may exist for each access mechanism, creating a need for effectively managing the interference these collisions may create.

In some examples of a sidelink communications system (e.g., V2X, cV2X), the system may provide a QoS profile and communication range to lower layers. In some cases, the system may also direct that control information contains the positions of a transmitting UE 115, the destination ID, and the intended communication range. Such control information may allow receiving devices to transmit HARQ feedback if they are within the communication range and cannot decode the transmitted data. In some cases, the communication range may also ensure that receiving wireless devices (e.g., UEs 115) in this range receive data packets more reliably. Additionally or alternatively, there may be minimal value to receiving a data packet beyond the communication range. Therefore, it may be beneficial to perform a sidelink link adaptation so that a UE 115 may reliably receive packets in the communication range and in order to reduce interference to other UEs 115 which do not need the transmitted data (e.g., both inside and outside of the communication range).

Wireless communications system 100 may support efficient techniques for a sidelink link adaption feedback scheme, in order to reduce interference during sidelink communications (e.g., V2X communications). In some cases, this may impact signal reception by allowing signals to be received at an efficient power level, while still meeting certain QoS requirements. For example, a first UE 115 may be configured to transmit using an initial configured power level and/or MCS. The first UE may transmit information (e.g., data packets) to a second UE 115 via a sidelink connection 135. Additionally, the first UE may begin transmitting at the initial configured power level and/or MCS, and then adjust the transmission power and/or MCS of subsequent transmissions with a same QoS as the initial transmission by a configured step, the adjustment allowing for decreased interference. In some examples, the initial configured power level and/or MCS and the configured step may be a function of a CBR and/or a priority of the transmission (e.g., indicated by the QoS of the initial transmission).

Additionally, the second UE may be configured with a threshold of a given signal quality (e.g., SINR, RSRP) to check against received transmissions. Accordingly, the second UE may send a link adaptation feedback message to the first UE if the parameter goes below the threshold and remains there for a configured amount of time. In some cases, the configured threshold and time may depend on the CBR and the transmission priority. Additionally or alternatively, the second UE may transmit a HARQ NACK feedback message if it is unable to decode a transmission successfully. Upon receiving the link adaptation feedback message or the HARQ NACK feedback message from the second UE, the first UE may increase its transmit power or reduce its MCS for a specified time duration to allow for higher chance of successful reception and decoding at the second UE for a message it sends.

Figure 2:
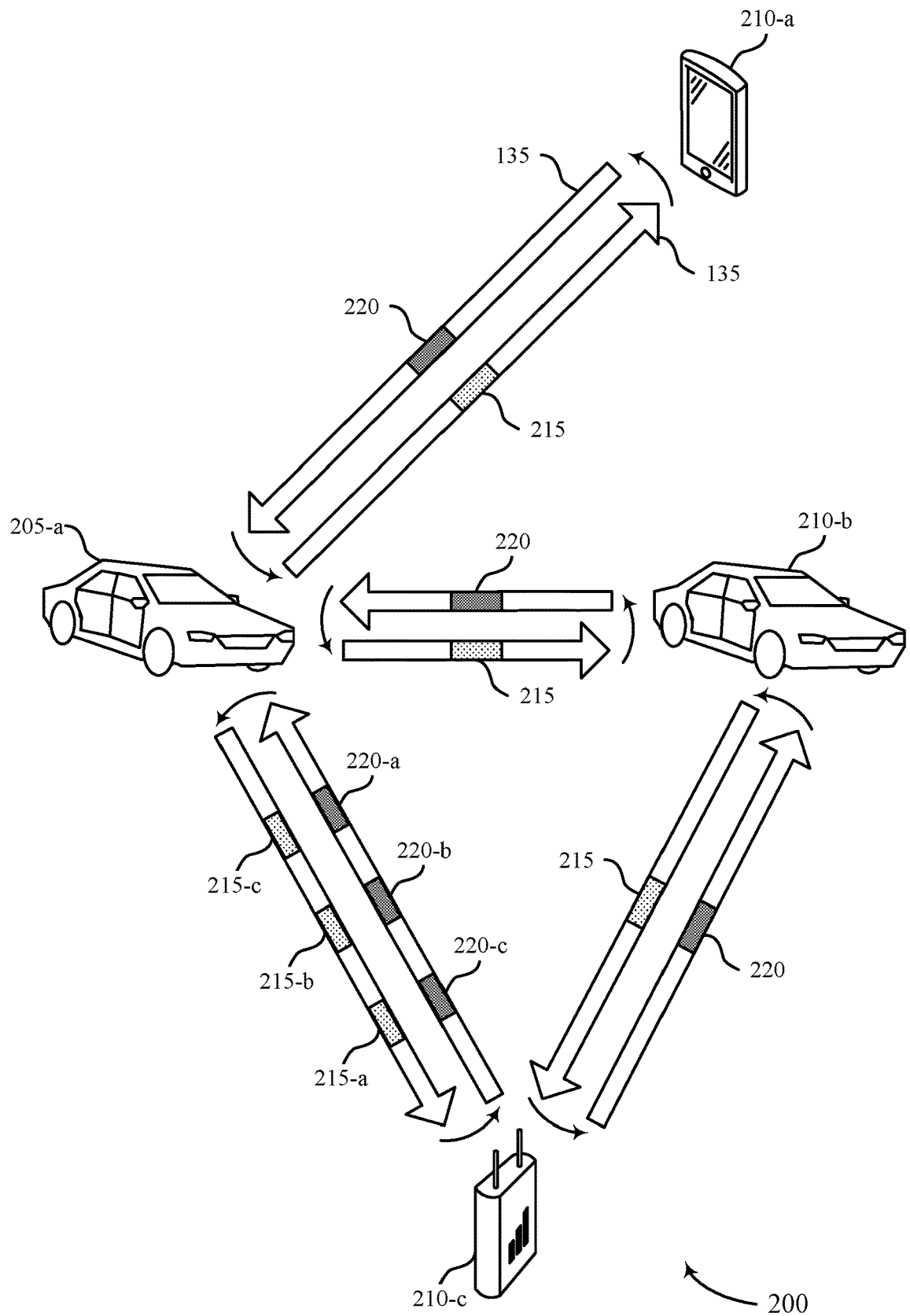
FIG. 2 illustrates an example of a wireless communications system that supports sidelink link adaptation feedback in accordance with aspects of the present disclosure.

FIG. 2 illustrates an example of a wireless communications system 200 that supports sidelink link adaptation feedback in accordance with aspects of the present disclosure. In some examples, wireless communications system 200 may implement aspects of wireless communications system 100. Wireless communications system 200 may include one or more transmitting devices 205 and one or more receiving devices 210, where the transmitting and receiving devices may be examples of UEs 115, as described with above reference to FIG. 1. Transmitting and receiving devices may include vehicles, handheld devices, personal computers, sensors, etc. Vehicles may include any mobile vehicle, such as an automobile, a bus, a train, a boat, a ship, a plane, and the like. In some examples, transmitting devices 205 may also be configured to simultaneously act as receiving devices 210; similarly, receiving devices 210 may be configured to simultaneously act as transmitting devices 205.

Wireless communications system 200 may be an example of a sidelink communication system (e.g., UEs 115 communicating via sidelinks 135). In one example, device 205-a may act as a transmitting device, devices 210-a and 210-c may act as receiving devices, and device 210-b may act as both a receiving device and a transmitting device. Transmitting device 205-a and receiving devices 210 may communicate with each other via sidelinks 135. Devices 205-a and 210-b may be vehicles that participate in V2X communication (e.g., over sidelinks 135 with devices 210-a and 210-b and/or over other links with other wireless devices). Such communication may include vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, and vehicle-to-grid (V2G) communication, among other types of communication. Devices 205-a and 210-b may participate in V2X communication that allows autonomous vehicles to share and gather information, such as trajectory and sensing information. Additionally, devices in a V2X system, such as the one described herein, may use methods to ensure that their transmissions do not interfere with those from other devices in the V2X system.

Wireless communications system 200 may implement a sidelink link adjustment scheme in order to more efficiently transmit data (e.g., data packets) at adequate power levels and share time-frequency resources. Transmitting device 205-a may begin the link adjustment process with a certain configured transmission power level and/or MCS (e.g., a certain power configuration, a first set of transmission parameters). In some cases, the power configuration may be implemented by RRC signaling or may be chosen by device 205-a (e.g., programmed into the device based on device characteristics). In some examples, this power configuration may be a function of a CBR measured over the transmission resources (e.g., transmission channel), as well as a function of the QoS of the data transmission (e.g., a priority level of the transmission). Thus, data packets 215 transmitted on a same channel, but with different priorities (e.g., or QoS profiles), may begin with different power configurations. Likewise, data packets 215 transmitted on channels with different measured CBRs, but with the same priorities, may begin with different power configurations. Such power configurations may be provided by RRC signaling or may be determined by the transmitting device for each priority level and CBR, and the respective power configurations may be independent of each other for each priority level.

As transmitting device 205-a transmits, it may adjust its power configuration (e.g., reduce transmission power and/or increase MCS) by a configured step each time it sends a new data packet 215 of a given priority level and channel. In some examples, the configured step may be based on the measured CBR of the channel and the priority of the data packet 215. Thus, as explained above, the configured step may differ, just as the rest of the power configuration differs, among different packet priorities and measured CBRs. In some cases, this power adjustment procedure (e.g., power adjustment loop) may occur independently for data packets 215 with different priorities.

For example, transmitting device 205-a may send data packets 215 that correspond to two different priorities, some with a first priority (e.g., higher priority) and some with a second priority (e.g., lower priority). In this example, transmitting device 205-a may begin a power adjustment loop for the first priority data packets by starting at a given power configuration and reducing by a configured step, where both the step and the initial configuration may depend on the CBR of the channel and the data packet priority. Additionally or alternatively, transmitting device 205-a may begin a power adjustment loop for the second priority data, at a same time as it begins the loop for the first priority, by similarly starting at a different given power configuration and reducing by a different configured step, where both the step and the initial configuration may depend on the CBR of the channel and the packet priority.

In some examples, transmitting device 205-a may transmit data packets 215 to receiving devices 210-a, 210-b, and 210-c. Additionally, receiving device 210-b may also act as a transmitting device 205 and transmit data packets 215 to device 210-c. Link adaptation may be necessary in such a system to reduce interference between transmissions intended for different devices (e.g., receiving devices 210-a, 210-b, and 210-c), as well as reducing interference between transmissions intended for the same device (e.g., receiving device 210-c). In some cases, each receiving device 210 may be configured with one or more device-specific thresholds for signal quality (e.g., SINR, RSRP). Each receiving device 210 may measure a signal quality (e.g., SINR or RSRP) as an instantaneous value or a filtered value in a certain time window.

In some examples, a receiving device 210 may not send a link adaptation feedback message in a feedback opportunity 220 as long as the signal quality measured by the device is above the configured threshold. However, a receiving device 210 may send a link adaptation feedback message as soon as one or more of the measured signal qualities goes below its threshold for a configured amount of time. In some cases, the configured threshold and time may depend on a CBR measured by the receiving device 210, which allows for traffic handling in case of congestion. In other cases, the configured threshold and time may depend on the priority of the data packet 215. In some cases, the configured threshold and time may depend on both the measured CBR and the data packet priority. The configured threshold and time may be implemented via RRC signaling or may be determined by the receiving device 210 (e.g., via embedded programming).

After determining that the measured signal quality falls below the corresponding threshold, a receiving device 210 may transmit a link adaptation feedback message, in a corresponding feedback opportunity 220, to transmitting device 205-a to indicate that transmitting device 205-a needs to adjust its power configuration. In some examples, the link adaptation feedback message may indicate for the power configuration to return to its previous value (e.g., the power configuration from the previous data packet) and to remain at that power configuration for a certain duration of time. In other examples, the link adaptation feedback message may specify a power configuration to hold for a certain duration of time. For example, the specified power configuration may include a power configuration different than one used for a previously transmitted data packet 215, but still enables the receiving device 210 to accurately receive and decode a subsequent data packet 215 transmitted with the certain duration of time. In some cases, the link adaptation feedback message may indicate for transmitting device 205-a to suspend any subsequent adjustments to the power configuration (e.g., reducing transmission power and/or increasing MCS). After receiving a link adaptation feedback message, transmitting device 205-a may adjust its power configuration accordingly.

Using a link adaptation feedback message in this manner allows the communicating devices to avoid continuous feedback (e.g., transmitting in every feedback opportunity 220), which may slow down transmissions and contribute to channel loading. Additionally, continuous feedback may restrict a device from receiving data packets 215 from other transmitting devices 205, due to the restrictions involved with HARQ duplexing. By sending a link adaptation feedback message only when a signal quality falls below a configured threshold, the system may reduce the amount of feedback traffic. Additionally or alternatively, sending a link adaptation feedback message may allow for feedback when the data packet signal reaches a certain quality, even though the data packet 215 may still be decoded. Thus, the link adaptation feedback messaging may help maintain a minimum QoS.

In one example, transmitting device 205-a may transmit a first data packet 215-a to receiving device 210-c using an initial power configuration, where the power configuration may be based on a measured CBR or a priority for the first data packet 215-a. Transmitting device 205-a may then adjust its power configuration (e.g., by lowering its transmit power and/or raising its MCS) by a configured step and send a second data packet 215-b at the new power configuration, where the second data packet 215-b is the same priority level as the first data packet 215-a (e.g., as indicated by a same QoS). Similarly, transmitting device 205-a may adjust its power configuration a second time by a configured step and send a third data packet 215-c to receiving device 210-c, at the new power configuration, where the third data packet 215-c has the same priority (e.g., same QoS) as the first data packet 215-a and the second data packet 215-b. In some cases, receiving device 210-c may determine that a data packet signal quality (e.g., SINR, RSRP) for data packets 215-a and 215-b lies above a threshold previously configured for device 210-c. Based on this determination, receiving device 210-c may further determine that there is no need to send a link adaptation feedback message at feedback opportunities 220-a and 220-b for the sidelink.

However, in some cases, receiving device 210-c may further determine that the data packet signal quality lies below the configured threshold for the third data packet 215-c and may, therefore, send a link adaptation feedback message at feedback opportunity 220-c. In one example, the link adaptation feedback message transmitted at opportunity 220-c may specify that transmitting device 205-a use the power configuration for data packet 215-b for future transmissions and may further specify the time period to maintain this power configuration. Alternatively, the link adaptation feedback message transmitted at opportunity 220-c may specify that transmitting device 205-a use a particular power configuration detailed in the link adaptation feedback message and maintain that power configuration for a specified amount of time. Upon receiving the link adjustment message, transmitting device 205-a may use the specified power configuration for future transmissions (e.g., subsequent data packets 215) of the same priority level to receiving device 210-c and hold that power configuration for the specified amount of time. Following the specified amount of time, transmitting device 205-a may return to the beginning of the procedure by determining an initial power configuration and transmitting a data packet 215 at that initial power configuration.

In an additional or alternative example of sidelink link adaptation, transmitting device 205-a may transmit data packets 215 to receiving devices 210-a, 210-b, and 210-c, as described above. Similar to what is described above, transmitting device 205-a may adjust the power configuration (e.g., lower transmit power and/or increase MCS) by a configured step each time it sends a new (e.g., subsequent) data packet 215. In some examples, the receiving devices 210 may perform HARQ feedback on the received data packets 215, and a receiving device 210 may send a NACK feedback to transmitting device 205-a when unable to decode a data packet 215. In some cases, HARQ feedback may occur irrespective of the system configuration for link adaptation (e.g., HARQ feedback may run at the same time a system uses the link adaptation feedback messages as described herein).

Additionally, transmitting device 205-a may be configured such that when it receives a NACK from a receiving device 210, transmitting device 205-a may use a power configuration from the previous data packet 215 for a configured duration of time. Additionally or alternatively, transmitting device 205-a may be configured such that when it receives a NACK, transmitting device 205-*a* may know to use a specified power configuration, not related to a previous data packet 215, for a configured duration of time. In some cases, the configured duration of time may depend on a CBR measured by the transmitting device 205-*a*, to allow traffic handling in case of congestion. In other cases, the configured threshold and duration of time may depend on the priority of the data packet 215. In some cases, the configured threshold and time may depend on both the measured CBR and the data packet priority.

For example, transmitting device 205-*a* may transmit a first data packet 215-*a* to receiving device 210-*c* using an initial power configuration. Transmitting device 205-*a* may then adjust its power configuration (e.g., by lowering its transmit power and/or raising its MCS) by a configured step and send a second data packet 215-*b* at the new configuration, where the second data packet 215-*b* is the same priority level (e.g., same QoS) as the first packet 215-*a*. Similarly, transmitting device 205-*a* may adjust its power configuration a second time by a configured step and send a third data packet 215-*c* to receiving device 210-*c*, at the new power configuration, where the third data packet 215-*c* has the same priority as packets 215-*a* and 215-*b*. Additionally, receiving device 210-*c* may perform HARQ feedback, and transmit HARQ feedback at opportunities 220-*a* and 220-*b* containing an acknowledgement (ACK) feedback indicating successfully decoded data packets 215-*a* and 215-*b*. In some examples, receiving device 210-*c* may be unable to decode the third data packet 215-*c*, and may therefore send a NACK feedback at opportunity 220-*c*. Upon receiving the NACK, transmitting device 205-*a* may use the power configuration for the second data packet 215-*b* for future transmissions of the same priority level to receiving device 210-*c*, and hold that power configuration for a specified amount of time. Alternatively, transmitting device 205-*a* may use a separate power configuration not used for either the second data packet 215-*b* or for the first data packet 215-*a*.

Figure 3:
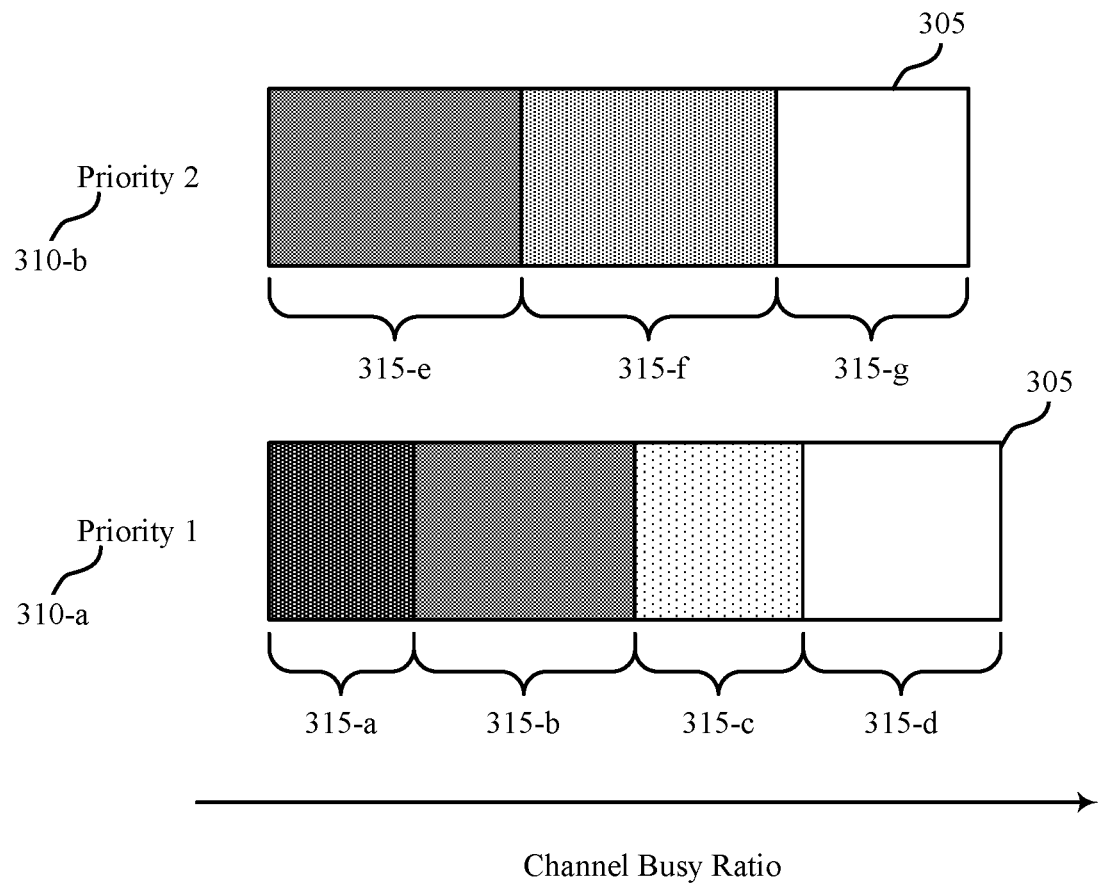
FIG. 3 illustrates an example of a power configuration mechanism that supports sidelink link adaptation feedback in accordance with aspects of the present disclosure.

FIG. 3 illustrates an example of a power configuration scheme 300 that supports sidelink link adaptation feedback in accordance with aspects of the present disclosure. In some examples, power configuration scheme 300 may implement aspects of wireless communications systems 100 and/or 200. For instance, power configuration scheme 300 may be implemented by a transmitting device 205 as described with reference to FIG. 2.

Power configuration scheme 300 may be used by a wireless communications system to determine an initial power configuration 305 and signal it (e.g., via RRC signaling) to a transmitting device 205 or a receiving device 210. Additionally or alternatively, a transmitting device 205 or receiving device 210 may implement power configuration scheme 300 to determine its own power configuration 305. As mentioned above with reference to FIG. 2, a power configuration for a transmitting device 205 may include a transmission power and/or transmission MCS, as well as a configured step to change the transmission power and/or transmission MCS for subsequent data transmissions after an initial data transmission. Additionally or alternatively, a power configuration scheme for a receiving device may include a threshold with which to compare signal qualities (e.g., SINR, RSRP), as well as a time duration corresponding to the threshold. As mentioned with reference to FIG. 2, a power configuration scheme may be dependent on one or more of a QoS (e.g., data packet priority 310) and a measured CBR value.

For example, if the CBR is found to be high (e.g., a high number of resources are occupied by the initial transmission within a spectrum for sidelink communications), a transmitting device 205 may start its initial transmission with a lower power and/or higher MCS (e.g., lower power configuration 305) to decrease chances of interference. Additionally or alternatively, if the CBR is found to be low (e.g., a low number of resources are occupied by the initial transmission within a frequency spectrum for sidelink communications), a transmitting device 205 may begin its initial transmission with a higher power and/or lower MCS (e.g., higher power configuration 305). Similarly, if a data packet is at a higher priority 310, the transmitting device may transmit the packet at a higher power configuration 305 than a data packet with lower priority 310, which may be transmitted at a lower power configuration 305.

Thus, as shown in power configuration scheme 300, various power configurations exist for different combinations of data packet priorities 310 and CBR ranges 315. While power configuration scheme 300 shows specific ranges of priorities 310 and CBRs 315, this scheme may extend to more priorities 310 and CBR ranges 315. The examples of different power configurations 305 applied to CBR ranges 315 in power configuration scheme 300, as well as the CBR ranges themselves, may vary depending on the wireless communications system, network conditions, device capabilities, etc., and may extend to any possible value of a CBR. Likewise, the power configurations 305 applied to different priority levels 310 may vary depending on the wireless communications system, network conditions, device capabilities, etc., and may extend to any number of data packet priority levels.

In one example, a transmitting device 205 may measure a CBR within the CBR range 315-*a*, may transmit packets assigned a priority level 1, and may therefore initiate transmissions with power configuration A. In another example, a transmitting device 205 may measure a CBR in the CBR range 315-*c* (e.g., a higher CBR than CBR range 315-*a*), may transmit packets assigned a priority level 1 and may, therefore, initiate transmissions with power configuration D, where D is a lower power configuration than A. This example may continue, such that a transmitting device 205 may measure a CBR in the CBR range 315-*d*, may transmit packets assigned a priority level 1, and may therefore initiate transmissions with power configuration E, where E is a lower power configuration than both A and D. In another case, a transmitting device may measure a CBR in the CBR range 315-*e*, may transmit packets assigned a priority level 2 (e.g., lower priority than priority level 1), and may therefore initiate transmissions with power configuration B, where B is a lower power configuration than A. The location and relationship between power configurations 305 assigned to priority levels 310 and CBR ranges 315 in power configuration scheme 300 is merely an example of what a wireless communications system may implement, and may vary depending on the wireless communications system, network conditions, device capabilities, etc.

Similar to the above examples of a transmitting device 205, a receiving device 210 or a wireless communications system may use a measured CBR and data packet priority 310, along with a power configuration scheme 300, to determine a power configuration 305 (e.g., signal quality threshold, configured time duration) for a receiving device 210. The power configuration schemes 300 for transmitting devices 205 and receiving devices 210 may or may not be equivalent in terms of the priority levels 310 and CBR ranges 315 used to assign power configurations 305.

Figure 4:
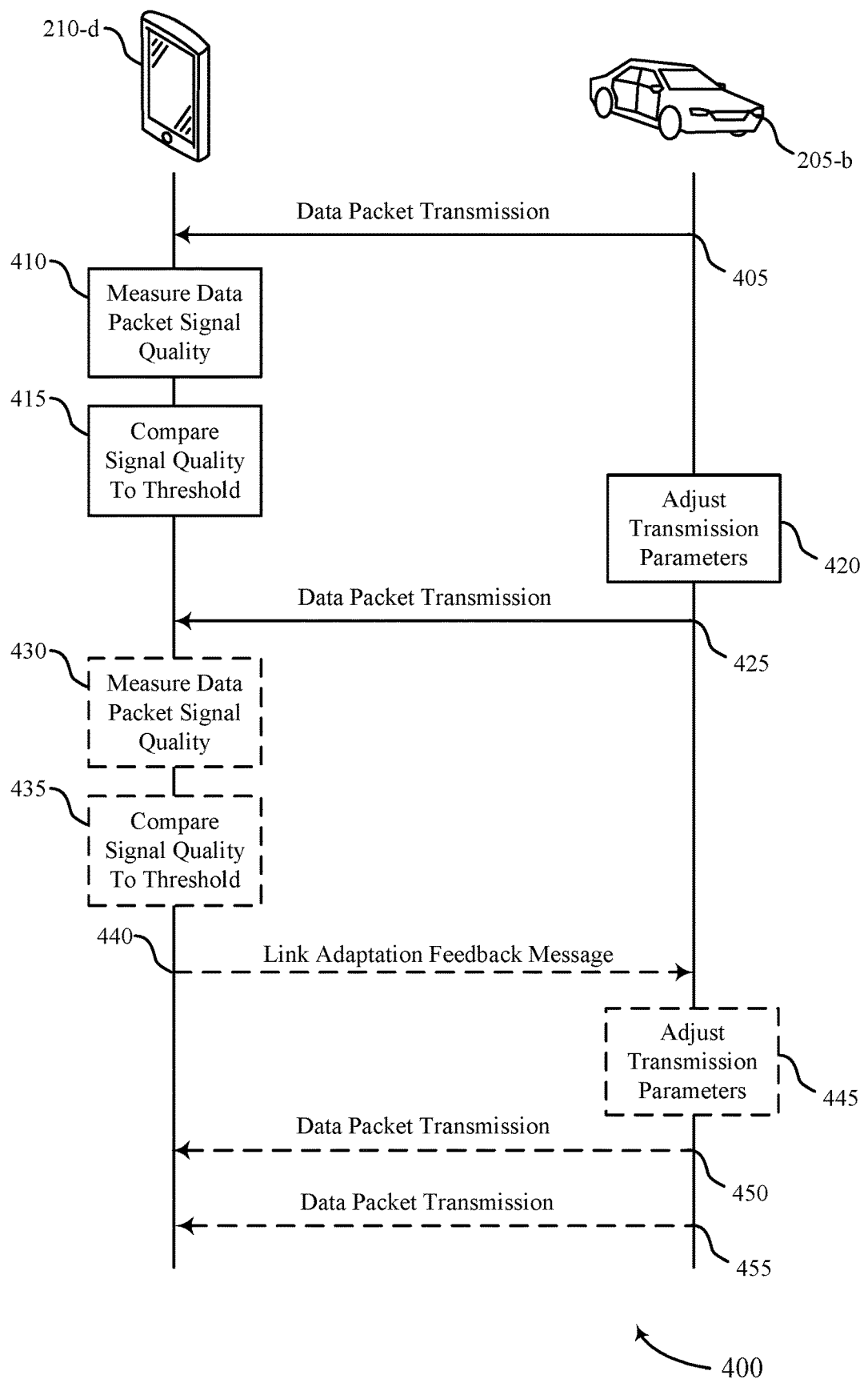
FIG. 4 illustrates an example of a process flow that supports sidelink link adaptation feedback in accordance with aspects of the present disclosure.

FIG. 4 illustrates an example of a process flow 400 that supports sidelink link adaptation feedback in accordance with aspects of the present disclosure. In some examples, process flow 400 may implement aspects of wireless communications systems 100 and/or 200 and power configuration scheme 300. Process flow 400 may include a transmitting device 205-b and a receiving device 210-d, which may be examples of corresponding devices as described herein with reference to FIGS. 1-3. While transmitting device 205-b is shown to be a vehicle and receiving device 210-d is show to be a cellular phone, it is to be understood that each device may be any example of a UE 115 as described herein with reference to FIG. 1.

In the following description of the process flow 400, the operations between the transmitting device 205-b and receiving device 210-d may be transmitted in a different order than the exemplary order shown, or the operations performed by transmitting device 205-b and receiving device 210-d may be performed in different orders or at different times. Certain operations may also be left out of the process flow 400, or other operations may be added to the process flow 400. It is to be understood that while transmitting device 205-b and receiving device 210-d are shown performing a number of the operations of process flow 400, any wireless device may perform the operations shown.

At 405, a transmitting device 205-b may transmit, via V2X sidelink communications, a first data packet in accordance with a first set of transmission parameters (e.g., a first power configuration) and a first QoS (e.g., a first data packet priority), where the first set of transmission parameters may be configured by higher layer signaling (e.g., RRC signaling). In some examples, the first set of transmission parameters may be based on one or more of the first QoS or a CBR for the first data packet. In some instances, the first QoS may include a first priority level for the first data packet.

At 410, a receiving device 210-d may measure a first signal quality for the first data packet, where the measured signal quality may include an SINR or an RSRP measurement. In some examples, the measured signal quality may include an instantaneous measurement or a filtered value for a time window.

At 415, receiving device 210-d may compare the first signal quality to a configured threshold value.

At 420, transmitting device 205-b may adjust the first set of transmission parameters according to a preconfigured amount (e.g., a configured step). In some examples, receiving device 210-d may determine to not transmit a feedback message to transmitting device 205-b, and in some cases, transmitting device 205-b may adjust the transmission parameters according to the preconfigured amount only after it has determined no such message was sent. Additionally, adjusting the first set of transmission parameters at 420 may include reducing a transmission power of the first set of transmission parameters by the preconfigured amount. Additionally or alternatively, adjusting the first set of transmission parameters at 420 may include increasing an MCS of the first set of transmission parameters by the preconfigured amount. In some cases, the preconfigured amount may be based on one or more of the first QoS or the CBR for the first data packet.

At 425, transmitting device 205-b may transmit, via the V2X sidelink communications, a second data packet in accordance with the adjusted first set of transmission parameters (e.g., a second set of transmission parameters) and the first QoS.

At 430, upon receiving the second data packet, receiving device 210-d may measure a second signal quality for the second data packet, where the measured signal quality may be an SINR or an RSRP measurement.

At 435, receiving device 210-d may compare the second signal quality to the configured threshold value, and in some cases, may determine that the second signal quality for the second data packet is below the configured threshold value, for a configured time duration. In some examples, the threshold value may be based on one or more of the first QoS or a CBR for the first data packet and the configured time duration may also be based on one or more of the first QoS or a CBR for the first data packet.

At 440, receiving device 210-d may transmit, via the V2X sidelink communications, a link adaptation feedback message based on the determination that the signal quality is below the configured threshold value. Additionally, the link adaptation message may indicate to transmitting device 205-b that the measured signal quality is below the threshold value.

In some examples, the link adaptation feedback message may contain an indication for transmitting device 205-b to adjust the second set of transmission parameters for transmitting one or more third data packets in accordance with a third set of transmission parameters. In some cases, the link adaptation message may indicate an increase in a transmission power from the second set of transmission parameters to the third set of transmission parameters. Additionally or alternatively, the link adaptation message may indicate a decrease in an MCS from the second set of transmission parameters to the third set of transmission parameters.

At 445, transmitting device 205-b may adjust the second set of transmission parameters for transmitting the one or more third data packets in accordance with the third set of transmission parameters, as specified in the link adaptation feedback message. In some examples, the third set of transmission parameters may include one or more same transmission parameters as the first set of transmission parameters. In other examples, the third set of transmission parameters may be a same set of parameters as the first set of transmission parameters. In other examples, the link adaptation message may indicate for device 205-b to maintain a set of transmission parameters for a period of time based on receiving the feedback message, where maintaining the parameters may include suspending adjustment of transmission parameters for the period of time. Additionally or alternatively, the set of parameters may be maintained above one or more of the first set of transmission parameters or the second set of transmission parameters.

At 450, transmitting device 205-b may transmit, via the V2X sidelink communications, the one or more third data packets, in accordance with the third set of transmission parameters which are different than the second set of transmission parameters, where the one or more third data packets are transmitted according to the first QoS. In some examples, the third set of transmission parameters may be based on the received feedback message, as discussed above, and the third set of transmission parameters may include a set of parameters indicated by the feedback message. In some examples, transmitting device 205-b may continue to transmit, via the V2X sidelink communications, the one or more third data packets in accordance with the third set of transmission parameters for a configured time duration. In some cases, the configured time duration may be based on one or more of the first QoS or the CBR for the first data packet.

At 455, transmitting device 205-b may transmit, via the V2X sidelink communications, an additional data packet in accordance with the first set of transmission parameters after the configured time duration ends.

Figure 5:
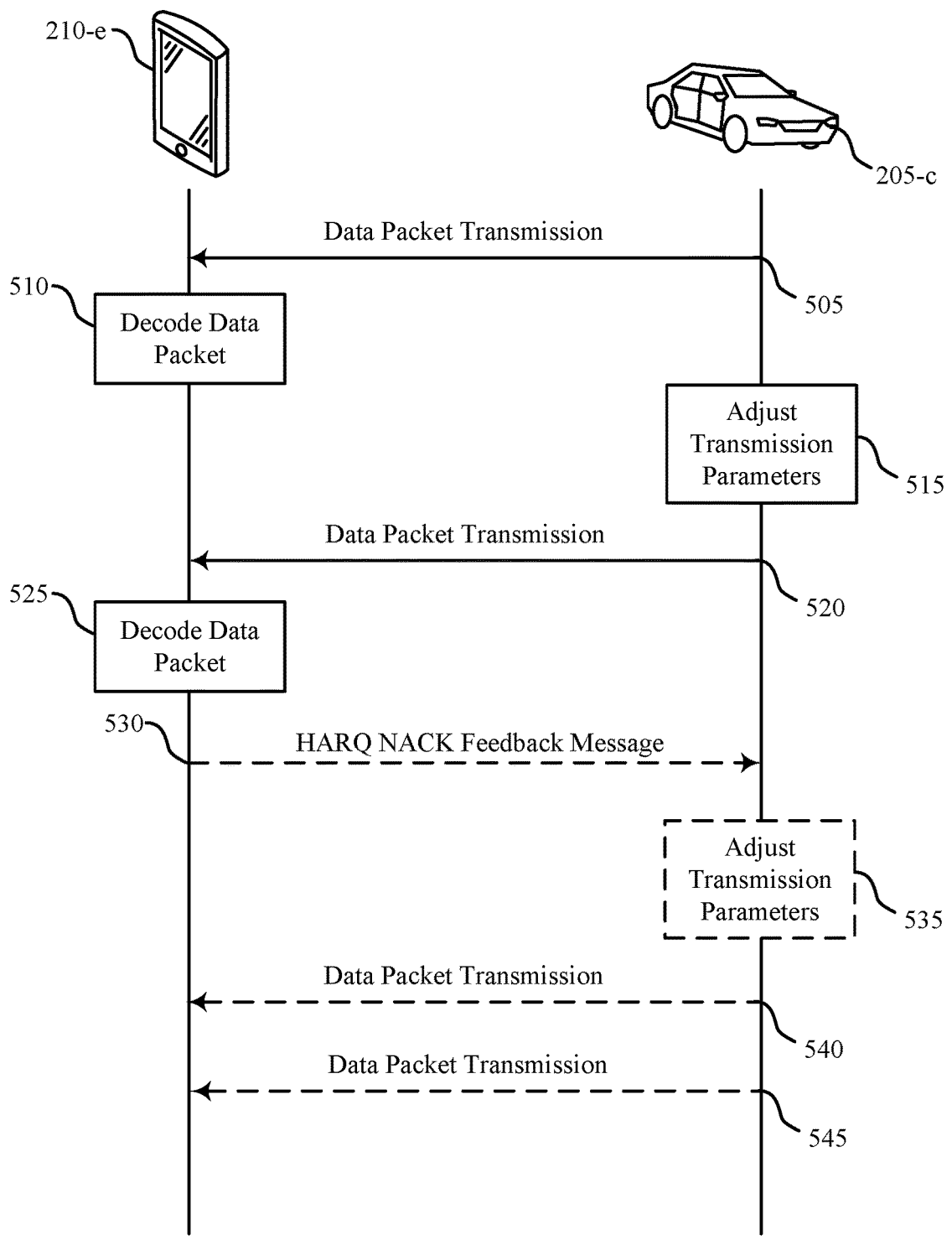
FIG. 5 illustrates an example of a process flow that supports sidelink link adaptation feedback in accordance with aspects of the present disclosure.

FIG. 5 illustrates an example of a process flow 500 that supports sidelink link adaptation feedback in accordance with aspects of the present disclosure. In some examples, process flow 500 may implement aspects of wireless communications systems 100 and/or 200 and power configuration scheme 300. Process flow 500 may include a transmitting device 205-c and a receiving device 210-e, which may be examples of corresponding devices as described herein with reference to FIGS. 1-4. While transmitting device 205-c is shown to be a vehicle and receiving device 210-e is show to be a cellular phone, it is to be understood that each device may be any example of a UE 115 as described herein with reference to FIG. 1.

In the following description of the process flow 500, the operations between the transmitting device 205-c and receiving device 210-e may be transmitted in a different order than the exemplary order shown, or the operations performed by transmitting device 205-c and receiving device 210-e may be performed in different orders or at different times. Certain operations may also be left out of the process flow 500, or other operations may be added to the process flow 500. It is to be understood that while transmitting device 205-c and receiving device 210-e are shown performing a number of the operations of process flow 500, any wireless device may perform the operations shown.

At 505, a transmitting device 205-c may transmit, via V2X sidelink communications, a first data packet in accordance with a first set of transmission parameters (e.g., a first power configuration) and a first QoS (e.g., a first data packet priority), where the first set of transmission parameters may be configured by higher layer signaling (e.g., RRC signaling). In some examples, the first set of transmission parameters may be based on one or more of the first QoS or a CBR for the first data packet. In some instances, the first QoS may include a first priority level for the first data packet.

At 510, a receiving device 210-e may decode the first data packet, using HARQ techniques.

At 515, transmitting device 205-c may adjust the first set of transmission parameters according to a preconfigured amount (e.g., a configured step). In some examples, receiving device 210-e may determine to not transmit a NACK feedback message to transmitting device 205-c, and in some cases, transmitting device 205-c may adjust the transmission parameters according to the preconfigured amount only after it has determined no such message was sent. Additionally, adjusting the first set of transmission parameters at 515 may include reducing a transmission power of the first set of transmission parameters by the preconfigured amount. Additionally or alternatively, adjusting the first set of transmission parameters at 515 may include increasing an MCS of the first set of transmission parameters by the preconfigured amount. In some cases, the preconfigured amount may be based on one or more of the first QoS or the CBR for the first data packet.

At 520, transmitting device 205-c may transmit, via the V2X sidelink communications, a second data packet in accordance with the adjusted first set of transmission parameters (e.g., a second set of transmission parameters) and the first QoS.

At 525, receiving device 210-e may decode the second data package using HARQ techniques and may fail to decode the second data packet.

At 530, receiving device 210-e may therefore transmit, via the V2X sidelink communications, a HARQ NACK feedback message based at least in part on failing to decode the second data packet. Additionally, at 530, receiving device 210-e may transmit an indication that transmitting device 205-c is to transmit one or more third data packets, in accordance with a third set of transmission parameters, for a configured time duration. In some examples, the configured time duration may be based on one or more of the first QoS or a CBR for the first data packet.

In some examples, the HARQ NACK feedback message may contain an indication for transmitting device 205-c to adjust the second set of transmission parameters for transmitting the one or more third data packets in accordance with the third set of transmission parameters. In some cases, the HARQ NACK feedback message may indicate an increase in a transmission power from the second set of transmission parameters to the third set of transmission parameters. Additionally or alternatively, the HARQ NACK feedback message may indicate a decrease in an MCS from the second set of transmission parameters to the third set of transmission parameters.

At 535, transmitting device 205-c may adjust the second set of transmission parameters for transmitting the one or more third data packets in accordance with the third set of transmission parameters, as specified in the HARQ NACK feedback message.

In some examples, the third set of transmission parameters may include one or more same transmission parameters as the first set of transmission parameters. In other examples, the third set of transmission parameters are a same set of parameters as the first set of transmission parameters. In other examples, the link adaptation message may indicate for device 205-c to maintain a set of transmission parameters for a period of time based on receiving the feedback message, where maintaining the parameters may include suspending adjustment of transmission parameters for the period of time. Additionally or alternatively, the set of parameters may be maintained above one or more of the first set of transmission parameters or the second set of transmission parameters.

At 540, transmitting device 205-c may transmit, via the V2X sidelink communications, the one or more third data packets, in accordance with the third set of transmission parameters which are different than the second set of transmission parameters, where the one or more third data packets are transmitted according to the first QoS. In some examples, the third set of transmission parameters may be based on the received feedback message, as discussed above, and the third set of transmission parameters may include a set of parameters indicated by the feedback message. Additionally or alternatively, the third set of transmission parameters may be determined by transmitting device 205-c, according to some system-specified configuration. In some examples, transmitting device 205-c may continue to transmit, via the V2X sidelink communications, the one or more third data packets in accordance with the third set of transmission parameters for a configured time duration. In some cases, the configured time duration may be based on one or more of the first QoS or the CBR for the first data packet.

At 545, transmitting device 205-c may transmit, via the V2X sidelink communications, an additional data packet in accordance with the first set of transmission parameters after the configured time duration ends.

Example 1 is a method for wireless communications at a transmitting device that includes transmitting, via a V2X sidelink communications, a first data packet in accordance with a first set of transmission parameters and a first QoS, adjusting the first set of transmission parameters according to a preconfigured amount, and transmitting, via the V2X sidelink communications, a second data packet in accordance with the adjusted first set of transmission parameters and the first QoS.

In example 2, the method of example 1 includes receiving, via the V2X sidelink communications, a feedback message for the second data packet, and transmitting, via the V2X sidelink communications, one or more third data packets in accordance with a third set of transmission parameters different than the adjusted first set of transmission parameters based on the received feedback message, where the one or more third data packets may be transmitted according to the first QoS.

In example 3, the method of any of examples 1-2 further includes receiving, via the V2X sidelink communications, a link adaptation feedback message indicating a measured signal quality of the second data packet may be below a threshold value.

In example 4, an in the method of any of examples 1-3, the measured signal quality may be an SINR or a RSRP measurement. In example 5, and in the method of any of examples 1-4, the threshold value may be based on one or more of the first QoS or a CBR for the first data packet.

In example 6, the method of any of examples 1-5 includes receiving, via the V2X sidelink communications, a HARQ NACK feedback message. In example 7, the method of any of examples 1-6 includes transmitting, via the V2X sidelink communications, the one or more third data packets in accordance with the third set of transmission parameters for a configured time duration, where the third set of transmission parameters include one or more same transmission parameters as the first set of transmission parameters.

In example 8, and in the method of any of examples 1-7, the configured time duration may be based on one or more of the first QoS or a CBR for the first data packet. In example 9, the method of any of examples 1-8 further includes transmitting, via the V2X sidelink communications, an additional data packet in accordance with the first set of transmission parameters after the configured time duration ends.

In example 10, and in the method of any of examples 1-9, the third set of transmission parameters includes a set of parameters indicated by the feedback message with one or more of a higher transmission power than the adjusted first set of transmission parameters or a lower MCS than the adjusted first set of transmission parameters.

In example 11, and in the method of any of examples 1-10, the third set of transmission parameters may be a same set of parameters as the first set of transmission parameters. In example 12, the method of any of examples 1-11 further includes receiving, via the V2X sidelink communications, a feedback message for the second data packet, maintaining a set of transmission parameters for a period of time based on receiving the feedback message and transmitting subsequent data packets at the maintained set of transmission parameters for the period of time.

In example 13, the method of any of examples 1-12 includes maintaining the set of transmission parameters may include operations, features, means, or instructions for suspending adjustment of transmission parameters for the period of time. In example 14, and in the method of any of examples 1-13, the set of transmission parameters may be maintained above one or more of the first set of transmission parameters or the adjusted first set of transmission parameters.

In example 15, the method of any of examples 1-14 further includes reducing a transmission power of the first set of transmission parameters by the preconfigured amount.

In example 16, the method of any of examples 1-15 includes increasing a MCS of the first set of transmission parameters by the preconfigured amount.

In example 17, and in the method of any of examples 1-16, the first set of transmission parameters and the preconfigured amount may be based on one or more of the first QoS or a CBR for the first data packet. In example 18, and in the method of any of examples 1-17, the first set of transmission parameters may be configured by higher layer signaling. In example 19, and in the method of any of examples 1-18, the first QoS includes a first priority level for the first data packet.

Example 20 is a system or apparatus including means for implementing a method or realizing an apparatus as in any of examples 1-19. Example 21 is a non-transitory computer-readable medium storing instructions executable by one or more processors to cause the one or more processors to implement a method as in any of examples 1-19. Example 22 is a system including one or more processors and memory in electronic communication with the one or more processors storing instructions executable by the one or more processors to cause the system or apparatus to implement a method as in any of examples 1-19. Aspects of these examples may be combined with aspects or embodiments disclosed in other implementations.

Example 23 is a method for wireless communications at a receiving device that includes receiving, via a V2X sidelink communications, a first data packet in accordance with a first set of transmission parameters and a first QoS, measuring a first signal quality for the first data packet, comparing the first signal quality to a configured threshold value, and receiving, via the V2X sidelink communications, a second data packet in accordance with a second set of transmission parameters based at least in part the measured first signal quality, where the second data packet is received according to the first QoS.

In example 24, the method of example 23 includes measuring a second signal quality for the second data packet, comparing the second signal quality to the configured threshold value, transmitting, via the V2X sidelink communications, a link adaptation feedback message based on the second signal quality for the second data packet being below the configured threshold value, and receiving, via the V2X sidelink communications, one or more third data packets in accordance with a third set of transmission parameters different than the second set of transmission parameters based on transmitting the link adaptation feedback message, where the second data packet may be received according to the first QoS.

In example 25, and in the method of any of examples 23-24, the link adaptation feedback message includes an indication for a transmitting device to adjust the second set of transmission parameters for transmitting the one or more third data packets in accordance with the third set of transmission parameters. In example 26, the method of any of examples 23-25 includes indicating, in the link adaptation feedback message, an increase in a transmission power from the second set of transmission parameters to the third set of transmission parameters for transmitting the one or more third data packets. In example 27, the method of any of examples 23-26 includes indicating, in the link adaptation feedback message, a decrease in a MCS from the second set of transmission parameters to the third set of transmission parameters for transmitting the one or more third data packets.

In example 28, the method of any of examples 23-27 includes determining that the second signal quality for the second data packet may be below the configured threshold value for a configured time duration. In example 29, and in the method of any of examples 23-28, the configured time duration may be based on one or more of the first QoS or a CBR for the first data packet. In example 30, and in the method of any of examples 23-29, the threshold value may be based on one or more of the first QoS or a CBR for the first data packet.

In example 31, the method of any of examples 23-30 includes measuring a second signal quality for the second data packet, comparing the second signal quality to the configured threshold value, and transmitting, via the V2X sidelink communications, a link adaptation feedback message based on the second signal quality for the second data packet being below the configured threshold value, where the link adaptation feedback message includes an indication to suspend adjustments of transmission parameters for a period of time.

In example 32, and in the method of any of examples 23-31, the second set of transmission parameters includes one or more of a lower transmission power or a higher MCS than the first set of transmission parameters. In example 33, and in the method of any of examples 23-32, the measured signal quality includes a SINR or a RSRP measurement. In example 34, and in the method of any of examples 23-33, the measured signal quality includes an instantaneous measurement or a filtered value for a time window. In example 35, and in the method of any of examples 23-34, the first QoS includes a first priority level for the first data packet.

Example 36 is a system or apparatus including means for implementing a method or realizing an apparatus as in any of examples 23-35. Example 37 is a non-transitory computer-readable medium storing instructions executable by one or more processors to cause the one or more processors to implement a method as in any of examples 23-35. Example 38 is a system including one or more processors and memory in electronic communication with the one or more processors storing instructions executable by the one or more processors to cause the system or apparatus to implement a method as in any of examples 23-35. Aspects of these examples may be combined with aspects or embodiments disclosed in other implementations.

Example 39 is a method for wireless communications at a receiving device that includes receiving, via a V2X sidelink communications, a first data packet in accordance with a first set of transmission parameters and a first QoS, decoding the first data packet, and receiving, via the V2X sidelink communications, a second data packet in accordance with a second set of transmission parameters based on the decoded first data packet, where the second data packet is received according to the first QoS.

In example 40, the method of examples 39 further includes transmitting, via the V2X sidelink communications, a HARQ NACK feedback message based on failing to decode the second data packet, and receiving, via the V2X sidelink communications, one or more third data packets in accordance with a third set of transmission parameters different than the second data packet based on transmitting the HARQ negative acknowledgement feedback message, where the one or more third data packets may be transmitted according to the first QoS.

In example 41, the method of any of examples 39-40 further includes transmitting an indication that a transmitting UE may be to transmit the one or more third data packets in accordance with the third set of transmission parameters for a configured time duration. In example 42, and in the method of any of examples 39-41, the configured time duration may be based on one or more of the first QoS or a CBR for the first data packet.

In example 43, the method of any of examples 39-42 includes transmitting, via the V2X sidelink communications, a HARQ NACK feedback message based on failing to decode the second data packet, where the HARQ negative acknowledgement feedback message includes an indication to suspend adjustments of transmission parameters for a period of time. In example 44, and in the method of any of examples 39-43, the second set of transmission parameters includes one or more of a lower transmission power or a higher MCS than the first set of transmission parameters. In example 45, and in the method of any of examples 39-44, the first QoS includes a first priority level for the first data packet.

Example 46 is a system or apparatus including means for implementing a method or realizing an apparatus as in any of examples 39-45. Example 47 is a non-transitory computer-readable medium storing instructions executable by one or more processors to cause the one or more processors to implement a method as in any of examples 39-45. Example 48 is a system including one or more processors and memory in electronic communication with the one or more processors storing instructions executable by the one or more processors to cause the system or apparatus to implement a method as in any of examples 39-45. Aspects of these examples may be combined with aspects or embodiments disclosed in other implementations.

Figure 6:
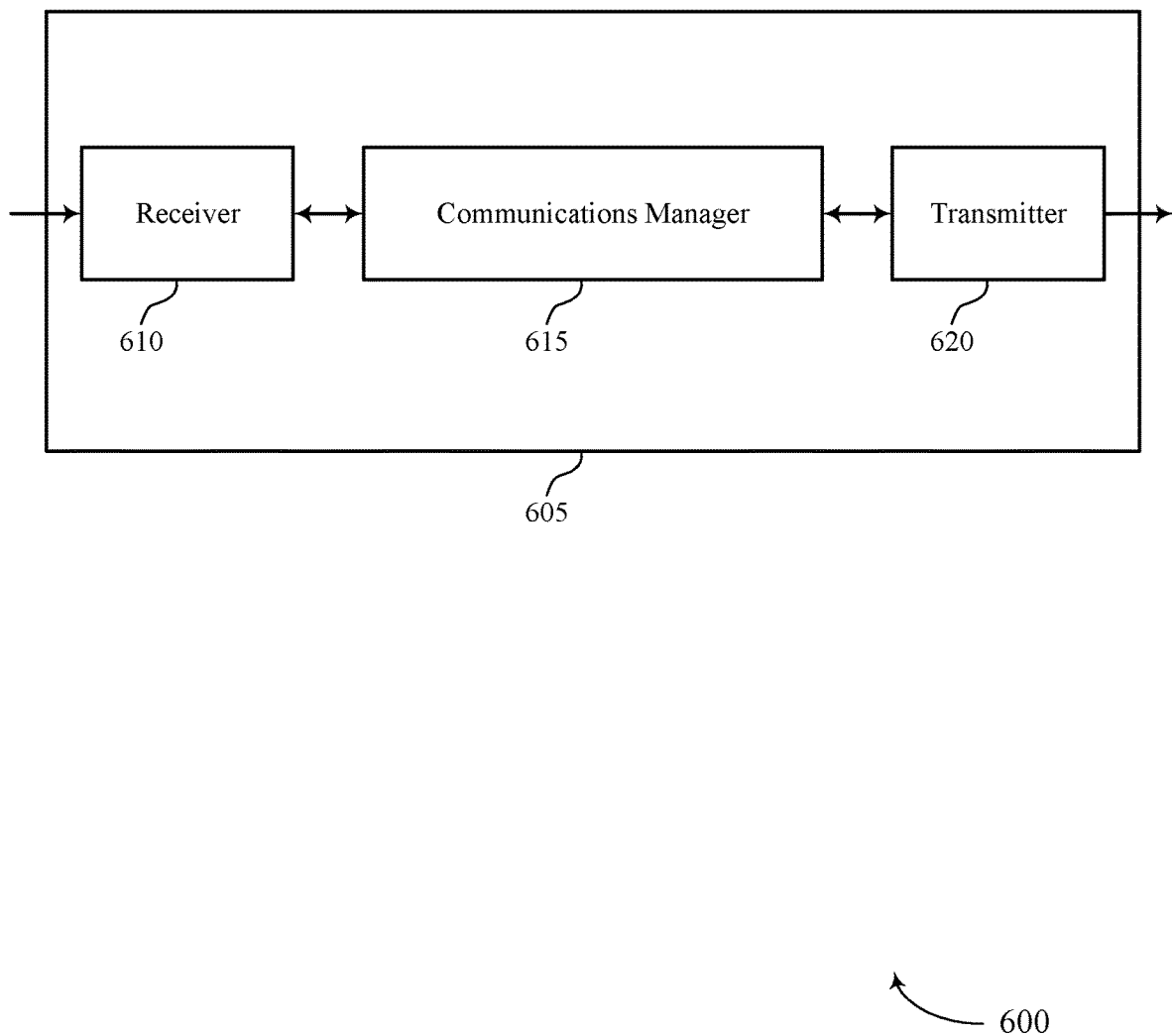
FIGS. 6 and 7 show block diagrams of devices that support sidelink link adaptation feedback in accordance with aspects of the present disclosure.

FIG. 6 shows a block diagram 600 of a device 605 that supports sidelink link adaptation feedback in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink link adaptation feedback, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may include various features, as described herein, though only some features may be used when the device 605 is acting as a transmitting device (e.g., first UE, transmitting UE, etc.), while other features may be limited to use when the device 605 is acting as a receiving device (e.g., second UE, receiving UE, etc.). For example, when acting as a transmitting device, the communications manager 615 may transmit, via a V2X sidelink communications, a first data packet in accordance with a first set of transmission parameters and a first QoS. In some cases, the communications manager 615 may adjust the first set of transmission parameters according to a preconfigured amount. Accordingly, the communications manager 615 may transmit, via the V2X sidelink communications, a second data packet in accordance with the adjusted first set of transmission parameters and the first QoS.

When the device 605 is acting as a transmitting device, the communications manager 615 as described herein may be implemented to realize one or more potential advantages.

One implementation may allow the device 605 to save power and increase battery life by communicating with a receiving device more efficiently. For example, the device 605 may efficiently transmit information to a receiving device over a V2X sidelink, as the device 605 may be able to reconfigure transmission parameters to determine a transmit power and MCS that minimizes power use and interference when communicating with the receiving device, while still reaching the receiving device at a quality that enables reception and/or decoding of the subsequent transmissions. Another implementation may promote low latency communications at the device 605, as a number of resources allocated to signaling overhead may be reduced.

Additionally or alternatively, when acting as a receiving device, the communications manager 615 may receive, via a V2X sidelink communications, a first data packet in accordance with a first set of transmission parameters and a first QoS. In some cases, the communications manager 615 may measure a first signal quality for the first data packet and compare the first signal quality to a configured threshold value. Accordingly, the communications manager 615 may receive, via the V2X sidelink communications, a second data packet in accordance with a second set of transmission parameters based on the measured first signal quality, where the second data packet is received according to the first QoS.

Additionally or alternatively, when acting as a receiving device, the communications manager 615 may receive, via a V2X sidelink communications, a first data packet in accordance with a first set of transmission parameters and a first QoS. In some cases, the communications manager 615 may decode the first data packet. Accordingly, the communications manager 615 may receive, via the V2X sidelink communications, a second data packet in accordance with a second set of transmission parameters based on the decoded first data packet, where the second data packet is received according to the first QoS. The communications manager 615 may be an example of aspects of the communications manager 910 described herein.

When the device 605 is acting as a receiving device, the communications manager 615 as described herein may be implemented to realize one or more potential advantages. One implementation may allow the device 605 to save power and increase battery life by communicating with a transmitting device more efficiently. For example, the device 605 may efficiently receive information from a transmitting device over a V2X sidelink, as the device 605 may be able to provide feedback for reconfiguring transmission parameters to determine a transmit power and MCS that minimizes power use and interference when receiving from the transmitting device, while still ensuring transmissions reach the receiving device at a quality that enables reception and/or decoding of the subsequent transmissions. Another implementation may promote low latency communications at the device 605, as a number of resources allocated to signaling overhead may be reduced.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
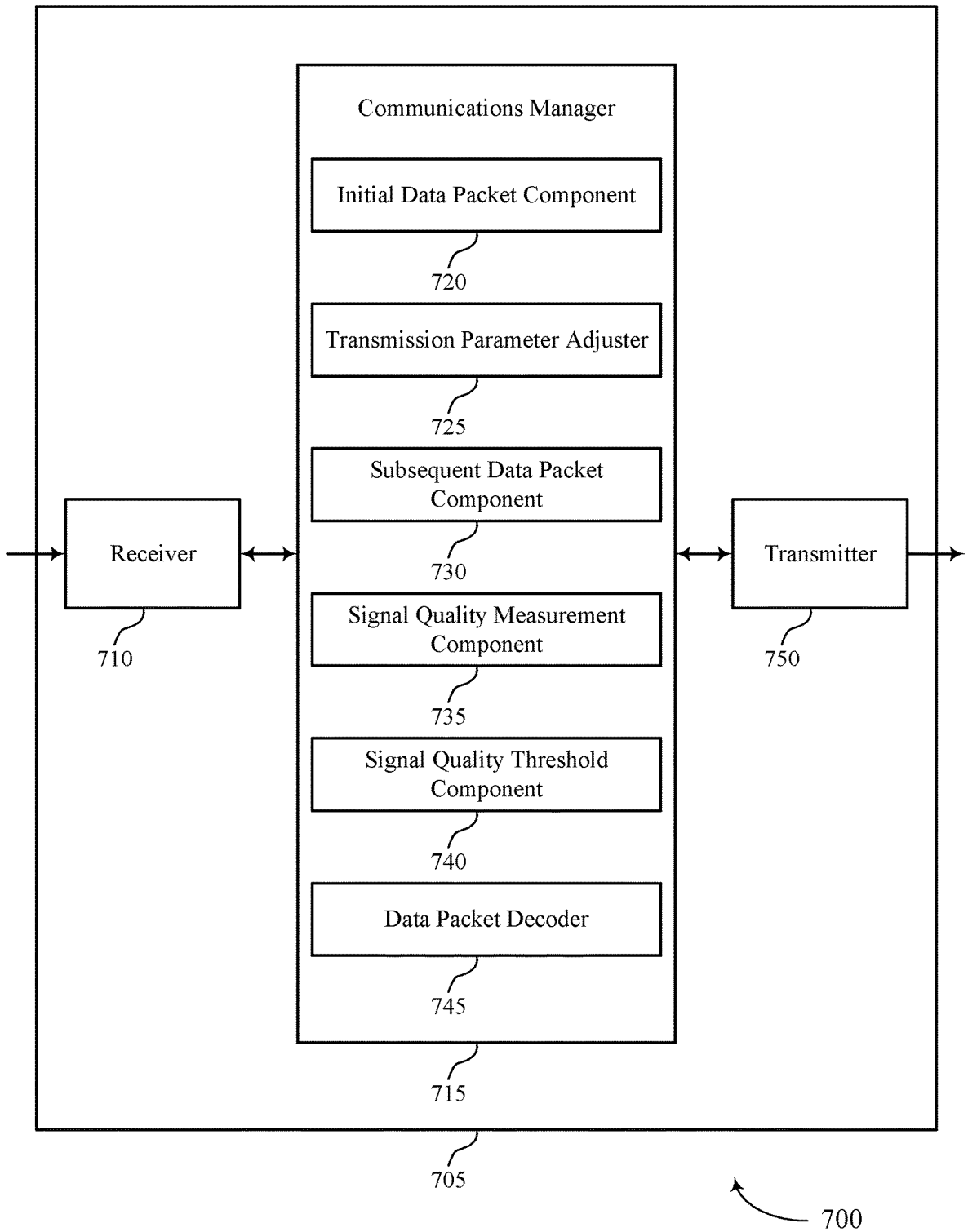

FIG. 7 shows a block diagram 700 of a device 705 that supports sidelink link adaptation feedback in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to sidelink link adaptation feedback, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include various features, as described herein, though only some features may be used when the device 705 is acting as a transmitting device (e.g., first UE, transmitting UE, etc.), while other features may be limited to use when the device 705 is acting as a receiving device (e.g., second UE, receiving UE, etc.). The communications manager 715 may include an initial data packet component 720, a transmission parameter adjuster 725, a subsequent data packet component 730, a signal quality measurement component 735, a signal quality threshold component 740, and a data packet decoder 745. The communications manager 715 may be an example of aspects of the communications manager 910 described herein.

When the device 705 is operating as a transmitting device, the communications manager 715 may include and use an initial data packet component 720. The initial data packet component 720 may transmit, via a V2X sidelink communications, a first data packet in accordance with a first set of transmission parameters and a first QoS.

When the device 705 is operating as a transmitting device, the communications manager 715 may include and use an transmission parameter adjuster 725. The transmission parameter adjuster 725 may adjust the first set of transmission parameters according to a preconfigured amount.

When the device 705 is operating as a transmitting device, the communications manager 715 may include and use a subsequent data packet component 730. The subsequent data packet component 730 may transmit, via the V2X sidelink communications, a second data packet in accordance with the adjusted first set of transmission parameters and the first QoS.

When the device 705 is operating as a receiving device, the communications manager 715 may include and use an initial data packet component 720. The initial data packet component 720 may receive, via a V2X sidelink communications, a first data packet in accordance with a first set of transmission parameters and a first QoS.

When the device 705 is operating as a receiving device, the communications manager 715 may include and use a signal quality measurement component 735. The signal quality measurement component 735 may measure a first signal quality for the first data packet.

When the device 705 is operating as a receiving device, the communications manager 715 may include and use a signal quality threshold component 740. The signal quality threshold component 740 may compare the first signal quality to a configured threshold value.

When the device 705 is operating as a receiving device, the communications manager 715 may include and use a subsequent data packet component 730. The subsequent data packet component 730 may receive, via the V2X sidelink communications, a second data packet in accordance with a second set of transmission parameters based on the measured first signal quality, where the second data packet is received according to the first QoS.

When the device 705 is operating as a receiving device, the communications manager 715 may include and use an initial data packet component 720. The initial data packet component 720 may receive, via a V2X sidelink communications, a first data packet in accordance with a first set of transmission parameters and a first QoS.

When the device 705 is operating as a receiving device, the communications manager 715 may include and use a data packet decoder 745. The data packet decoder 745 may decode the first data packet.

When the device 705 is operating as a receiving device, the communications manager 715 may include and use a subsequent data packet component 730. The subsequent data packet component 730 may receive, via the V2X sidelink communications, a second data packet in accordance with a second set of transmission parameters based on the decoded first data packet, where the second data packet is received according to the first QoS.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
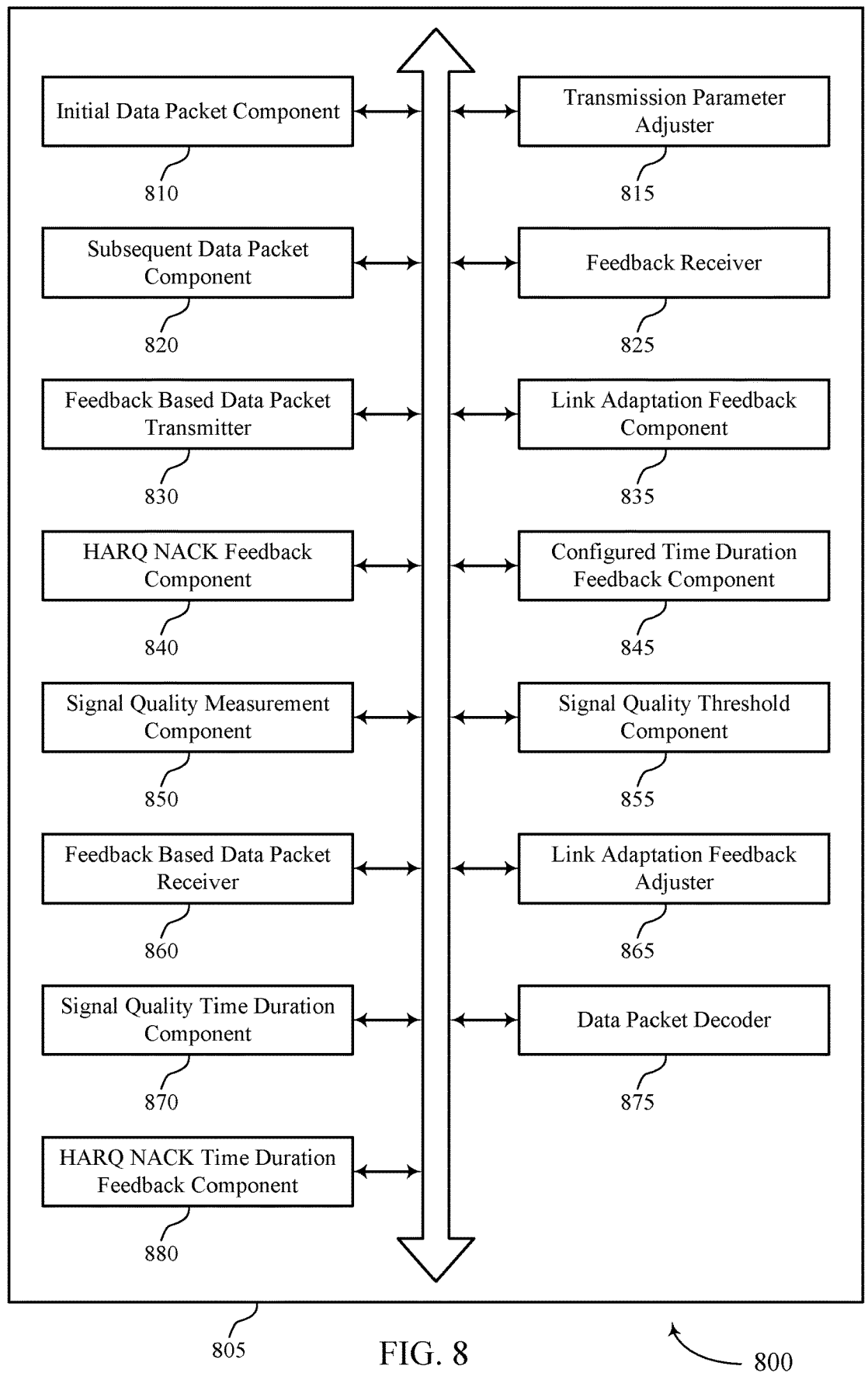
FIG. 8 shows a block diagram of a communications manager that supports sidelink link adaptation feedback in accordance with aspects of the present disclosure.

FIG. 8 shows a block diagram 800 of a communications manager 805 that supports sidelink link adaptation feedback in accordance with aspects of the present disclosure. The communications manager 805 may be an example of aspects of a communications manager 615, a communications manager 715, or a communications manager 910 described herein. The communications manager 805 may include various features, as described herein, for a device, though only some features may be used when the device is acting as a transmitting device (e.g., first UE, transmitting UE, etc.), while other features may be limited to use when the device is acting as a receiving device (e.g., second UE, receiving UE, etc.). The communications manager 805 may include an initial data packet component 810, a transmission parameter adjuster 815, a subsequent data packet component 820, a feedback receiver 825, a feedback based data packet transmitter 830, a link adaptation feedback component 835, a HARQ NACK feedback component 840, a configured time duration feedback component 845, a signal quality measurement component 850, a signal quality threshold component 855, a feedback based data packet receiver 860, a link adaptation feedback adjuster 865, a signal quality time duration component 870, a data packet decoder 875, and a HARQ NACK time duration feedback component 880. Each of these modules may communicate, directly or indirectly, with one another (e.g., via one or more buses).

When the device is operating as a transmitting device, the communications manager 805 may include and use an initial data packet component 810. The initial data packet component 810 may transmit, via a V2X sidelink communications, a first data packet in accordance with a first set of transmission parameters and a first QoS. In some cases, the first set of transmission parameters is configured by higher layer signaling. Additionally, the first QoS includes a first priority level for the first data packet.

When the device is operating as a receiving device, the communications manager 805 may include and use an initial data packet component 810. Accordingly, the initial data packet component 810 may receive, via a V2X sidelink communications, a first data packet in accordance with a first set of transmission parameters and a first QoS. In some cases, the first set of transmission parameters is configured by higher layer signaling. Additionally, the first QoS includes a first priority level for the first data packet.

When the device is operating as a transmitting device, the communications manager 805 may include and use a transmission parameter adjuster 815. The transmission parameter adjuster 815 may adjust the first set of transmission parameters according to a preconfigured amount. In some cases, the first set of transmission parameters and the preconfigured amount are based on one or more of the first QoS or a channel busy ratio for the first data packet. In some examples, the transmission parameter adjuster 815 may reduce a transmission power of the first set of transmission parameters by the preconfigured amount. In some examples, the transmission parameter adjuster 815 may increase a MCS of the first set of transmission parameters by the preconfigured amount.

When the device is operating as a transmitting device, the communications manager 805 may include and use a subsequent data packet component 820. The subsequent data packet component 820 may transmit, via the V2X sidelink communications, a second data packet in accordance with the adjusted first set of transmission parameters and the first QoS.

When the device is operating as a receiving device, the communications manager 805 may include and use a subsequent data packet component 820. Accordingly, the subsequent data packet component 820 may receive, via the V2X sidelink communications, a second data packet in accordance with a second set of transmission parameters based on the measured first signal quality, where the second data packet is received according to the first QoS. Additionally or alternatively, the subsequent data packet component 820 may receive, via the V2X sidelink communications, a second data packet in accordance with a second set of transmission parameters based on the decoded first data packet, where the second data packet is received according to the first QoS. In some cases, the second set of transmission parameters includes one or more of a lower transmission power or a higher MCS than the first set of transmission parameters.

When the device is operating as a receiving device, the communications manager 805 may include and use a signal quality measurement component 850. The signal quality measurement component 850 may measure a first signal quality for the first data packet. In some examples, the signal quality measurement component 850 may measure a second signal quality for the second data packet. In some cases, the measured signal quality includes a signal-to-interference-plus-noise ratio or a reference signal received power measurement. Additionally, the measured signal quality includes an instantaneous measurement or a filtered value for a time window.

When the device is operating as a receiving device, the communications manager 805 may include and use a signal quality threshold component 855. The signal quality threshold component 855 may compare the first signal quality to a configured threshold value. In some examples, the signal quality threshold component 855 may compare the second signal quality to the configured threshold value. In some cases, the configured threshold value is based on one or more of the first QoS or a channel busy ratio for the first data packet.

When the device is operating as a receiving device, the communications manager 805 may include and use a data packet decoder 875. The data packet decoder 875 may decode the first data packet.

When the device is operating as a transmitting device, the communications manager 805 may include and use a feedback receiver 825. The feedback receiver 825 may receive, via the V2X sidelink communications, a feedback message for the second data packet.

When the device is operating as a transmitting device, the communications manager 805 may include and use a feedback based data packet transmitter 830. The feedback based data packet transmitter 830 may transmit, via the V2X sidelink communications, one or more third data packets in accordance with a third set of transmission parameters different than the adjusted first set of transmission parameters based on the received feedback message, where the one or more third data packets are transmitted according to the first QoS. In some cases, the third set of transmission parameters include a set of parameters indicated by the feedback message with one or more of a higher transmission power than the adjusted first set of transmission parameters or a lower MCS than the adjusted first set of transmission parameters. In some cases, the third set of transmission parameters are a same set of parameters as the first set of transmission parameters.

In some examples, the feedback based data packet transmitter 830 may maintain a set of transmission parameters for a period of time based on receiving the feedback message. In some cases, the set of transmission parameters are maintained above one or more of the first set of transmission parameters or the adjusted first set of transmission parameters.

When the device is operating as a receiving device, the communications manager 805 may include and use a feedback based data packet transmitter 830. In some examples, the feedback based data packet transmitter 830 may transmit subsequent data packets at the maintained set of transmission parameters for the period of time. Additionally, the feedback based data packet transmitter 830 may suspend adjustment of transmission parameters for the period of time.

When the device is operating as a transmitting device, the communications manager 805 may include and use a link adaptation feedback component 835. The link adaptation feedback component 835 may receive, via the V2X sidelink communications, a link adaptation feedback message indicating a measured signal quality of the second data packet is below a threshold value. In some cases, the measured signal quality is a signal-to-interference-plus-noise ratio or a reference signal received power measurement. In some cases, the threshold value is based on one or more of the first QoS or a channel busy ratio for the first data packet.

When the device is operating as a receiving device, the communications manager 805 may include and use a link adaptation feedback component 835. Accordingly, the link adaptation feedback component 835 may transmit, via the V2X sidelink communications, a link adaptation feedback message based on the second signal quality for the second data packet being below the configured threshold value. In some examples, transmitting the link adaptation feedback message may include transmitting an indication to suspend adjustments of transmission parameters for a period of time. In some cases, the link adaptation feedback message includes an indication for a transmitting device to adjust the second set of transmission parameters for transmitting the one or more third data packets in accordance with the third set of transmission parameters.

When the device is operating as a transmitting device, the communications manager 805 may include and use a HARQ NACK feedback component 840. The HARQ NACK feedback component 840 may receive, via the V2X sidelink communications, a HARQ negative acknowledgement feedback message.

When the device is operating as a receiving device, the communications manager 805 may include and use a HARQ NACK feedback component 840. In some examples, the HARQ NACK feedback component 840 may transmit, via the V2X sidelink communications, a HARQ negative acknowledgement feedback message based on failing to decode the second data packet. In some examples, transmitting the HARQ negative acknowledgement feedback message may include transmitting an indication to suspend adjustments of transmission parameters for a period of time.

When the device is operating as a transmitting device, the communications manager 805 may include and use a configured time duration feedback component 845. The configured time duration feedback component 845 may transmit, via the V2X sidelink communications, the one or more third data packets in accordance with the third set of transmission parameters for a configured time duration, where the third set of transmission parameters include one or more same transmission parameters as the first set of transmission parameters. In some examples, the configured time duration feedback component 845 may transmit, via the V2X sidelink communications, an additional data packet in accordance with the first set of transmission parameters after the configured time duration ends. In some cases, the configured time duration is based on one or more of the first QoS or a channel busy ratio for the first data packet.

When the device is operating as a receiving device, the communications manager 805 may include and use a feedback based data packet receiver 860. The feedback based data packet receiver 860 may receive, via the V2X sidelink communications, one or more third data packets in accordance with a third set of transmission parameters different than the second set of transmission parameters based on transmitting the link adaptation feedback message, where the second data packet is received according to the first QoS. Additionally or alternatively, the feedback based data packet receiver 860 may receive, via the V2X sidelink communications, one or more third data packets in accordance with a third set of transmission parameters different than the second data packet based on transmitting the HARQ negative acknowledgement feedback message, where the one or more third data packets is transmitted according to the first QoS.

When the device is operating as a receiving device, the communications manager 805 may include and use a link adaptation feedback adjuster 865. The link adaptation feedback adjuster 865 may indicate, in the link adaptation feedback message, an increase in a transmission power from the second set of transmission parameters to the third set of transmission parameters for transmitting the one or more third data packets. Additionally or alternatively, the link adaptation feedback adjuster 865 may indicate, in the link adaptation feedback message, a decrease in an MCS from the second set of transmission parameters to the third set of transmission parameters for transmitting the one or more third data packets.

When the device is operating as a receiving device, the communications manager 805 may include and use a signal quality time duration component 870. The signal quality time duration component 870 may determine that the second signal quality for the second data packet is below the configured threshold value for a configured time duration. In some cases, the configured time duration is based on one or more of the first QoS or a channel busy ratio for the first data packet.

When the device is operating as a receiving device, the communications manager 805 may include and use a HARQ NACK time duration feedback component 880. The HARQ NACK time duration feedback component 880 may transmit an indication that a transmitting UE is to transmit the one or more third data packets in accordance with the third set of transmission parameters for a configured time duration. In some cases, the configured time duration is based on one or more of the first QoS or a channel busy ratio for the first data packet.

Figure 9:
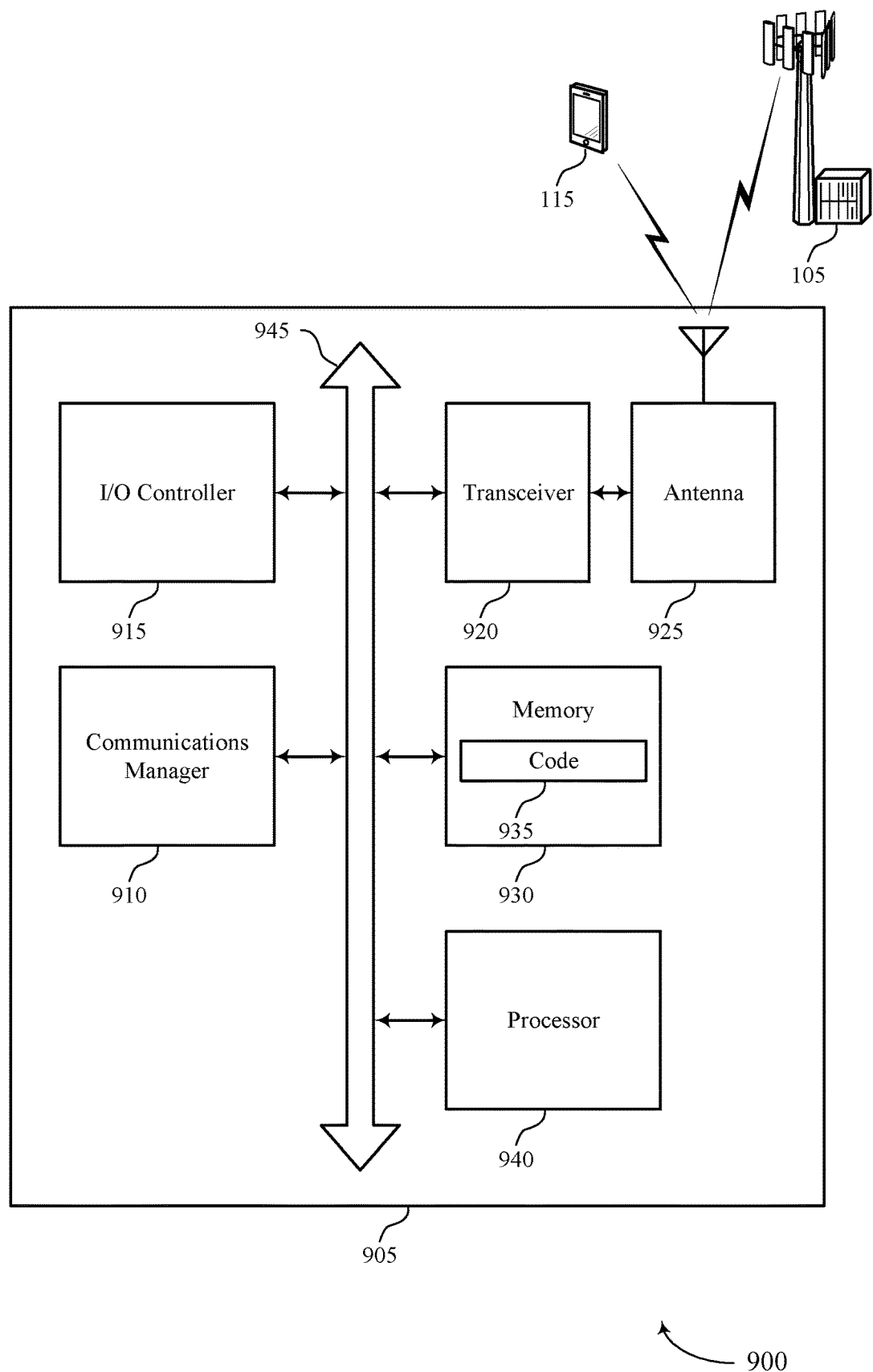
FIG. 9 shows a diagram of a system including a device that supports sidelink link adaptation feedback in accordance with aspects of the present disclosure.

FIG. 9 shows a diagram of a system 900 including a device 905 that supports sidelink link adaptation feedback in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 915 may include various features, as described herein, though only some features may be used when the device 905 is acting as a transmitting device (e.g., first UE, transmitting UE, etc.), while other features may be limited to use when the device 905 is acting as a receiving device (e.g., second UE, receiving UE, etc.). For example, when device 905 is operating as a transmitting device, the communications manager 910 may transmit, via a V2X sidelink communications, a first data packet in accordance with a first set of transmission parameters and a first QoS. In some cases, the communications manager 910 may adjust the first set of transmission parameters according to a preconfigured amount. Accordingly, the communications manager 910 may transmit, via the V2X sidelink communications, a second data packet in accordance with the adjusted first set of transmission parameters and the first QoS.

Additionally or alternatively, when device 905 is operating as a receiving device, the communications manager 910 may receive, via a V2X sidelink communications, a first data packet in accordance with a first set of transmission parameters and a first QoS. In some cases, the communications manager 910 may measure a first signal quality for the first data packet and compare the first signal quality to a configured threshold value. Accordingly, the communications manager 910 may receive, via the V2X sidelink communications, a second data packet in accordance with a second set of transmission parameters based on the measured first signal quality, where the second data packet is received according to the first QoS.

Additionally or alternatively, when device 905 is operating as a receiving device, the communications manager 910 may receive, via a V2X sidelink communications, a first data packet in accordance with a first set of transmission parameters and a first QoS. In some cases, the communications manager 910 may decode the first data packet. Accordingly, the communications manager 910 may receive, via the V2X sidelink communications, a second data packet in accordance with a second set of transmission parameters based on the decoded first data packet, where the second data packet is received according to the first QoS.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink link adaptation feedback).

The processor 940 of the device 905 (e.g., controlling the receiver 610, the transmitter 620, or the transceiver 920) may reduce power consumption and increase data packet transmission reliability based on adapting the V2X sidelink. In some examples, such as when the device 905 is operating as a transmitting device, the processor 940 of the device 905 may reconfigure parameters for transmitting over the V2X sidelink. For example, the processor 940 of the device 905 may turn on one or more processing units for performing a data packet transmission, increase a processing clock, or a similar mechanism within the device 905. As such, when subsequent data packet transmissions are required, the processor 940 may be ready to respond more efficiently through the reduction of a ramp up in processing power. The improvements in power saving and data packet transmission reliability may further increase battery life at the device 905 (for example, by reducing or eliminating unnecessary or failed data packet transmissions, etc.).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
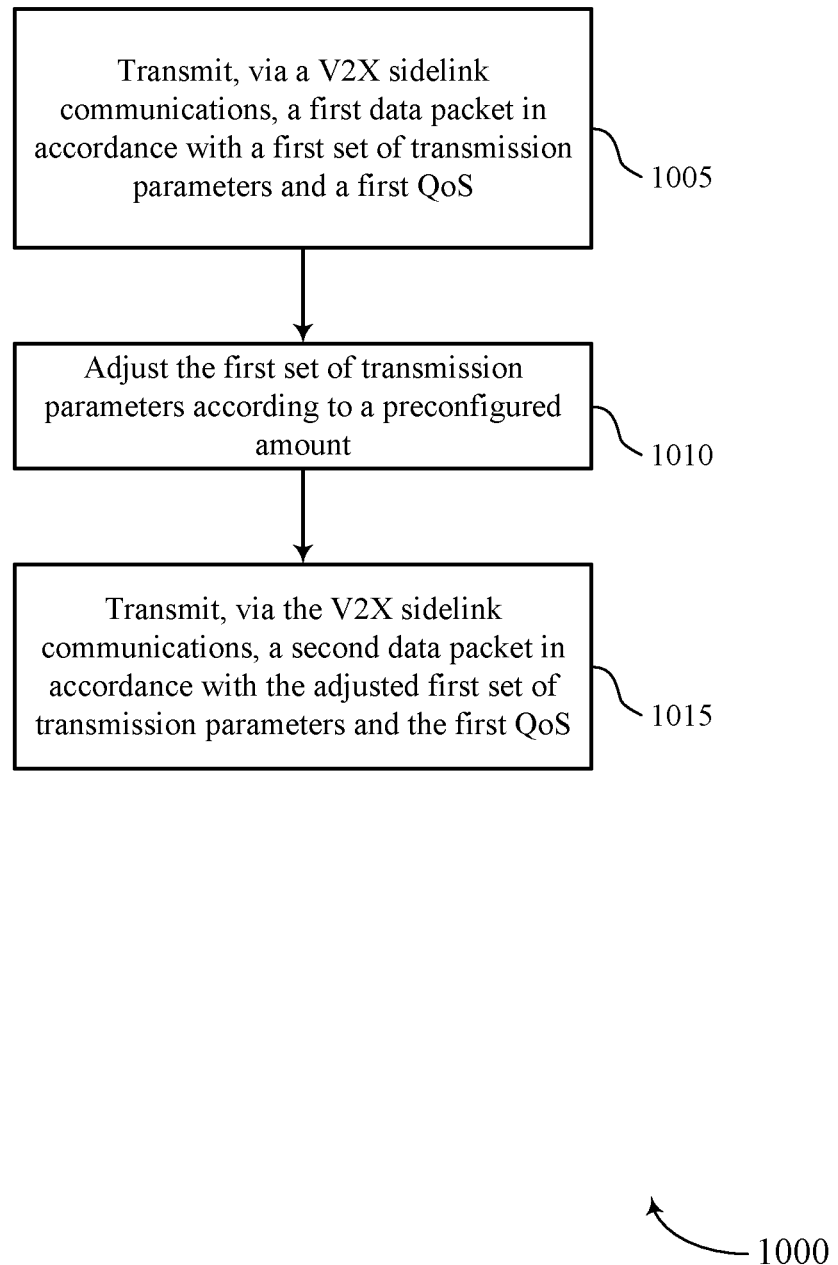
FIGS. 10 through 15 show flowcharts illustrating methods that support sidelink link adaptation feedback in accordance with aspects of the present disclosure.

FIG. 10 shows a flowchart illustrating a method 1000 that supports sidelink link adaptation feedback in accordance with aspects of the present disclosure. The operations of method 1000 may be implemented by a UE 115 or its components as described herein. For example, the operations of method 1000 may be performed by a communications manager as described with reference to FIGS. 6 through 9, where the UE is a transmitting device (e.g., transmitting UE). In some examples, a UE may execute a set of instructions to control the functional elements of the UE to perform the functions described herein. Additionally or alternatively, a UE may perform aspects of the functions described herein using special-purpose hardware.

At 1005, the transmitting device may transmit, via a V2X sidelink communications, a first data packet in accordance with a first set of transmission parameters and a first QoS. The operations of 1005 may be performed according to the methods described herein. In some examples, aspects of the operations of 1005 may be performed by an initial data packet component as described with reference to FIGS. 6 through 9.

At 1010, the transmitting device may adjust the first set of transmission parameters according to a preconfigured amount. The operations of 1010 may be performed according to the methods described herein. In some examples, aspects of the operations of 1010 may be performed by a transmission parameter adjuster as described with reference to FIGS. 6 through 9.

At 1015, the transmitting device may transmit, via the V2X sidelink communications, a second data packet in accordance with the adjusted first set of transmission parameters and the first QoS. The operations of 1015 may be performed according to the methods described herein. In some examples, aspects of the operations of 1015 may be performed by a subsequent data packet component as described with reference to FIGS. 6 through 9.

Figure 11:
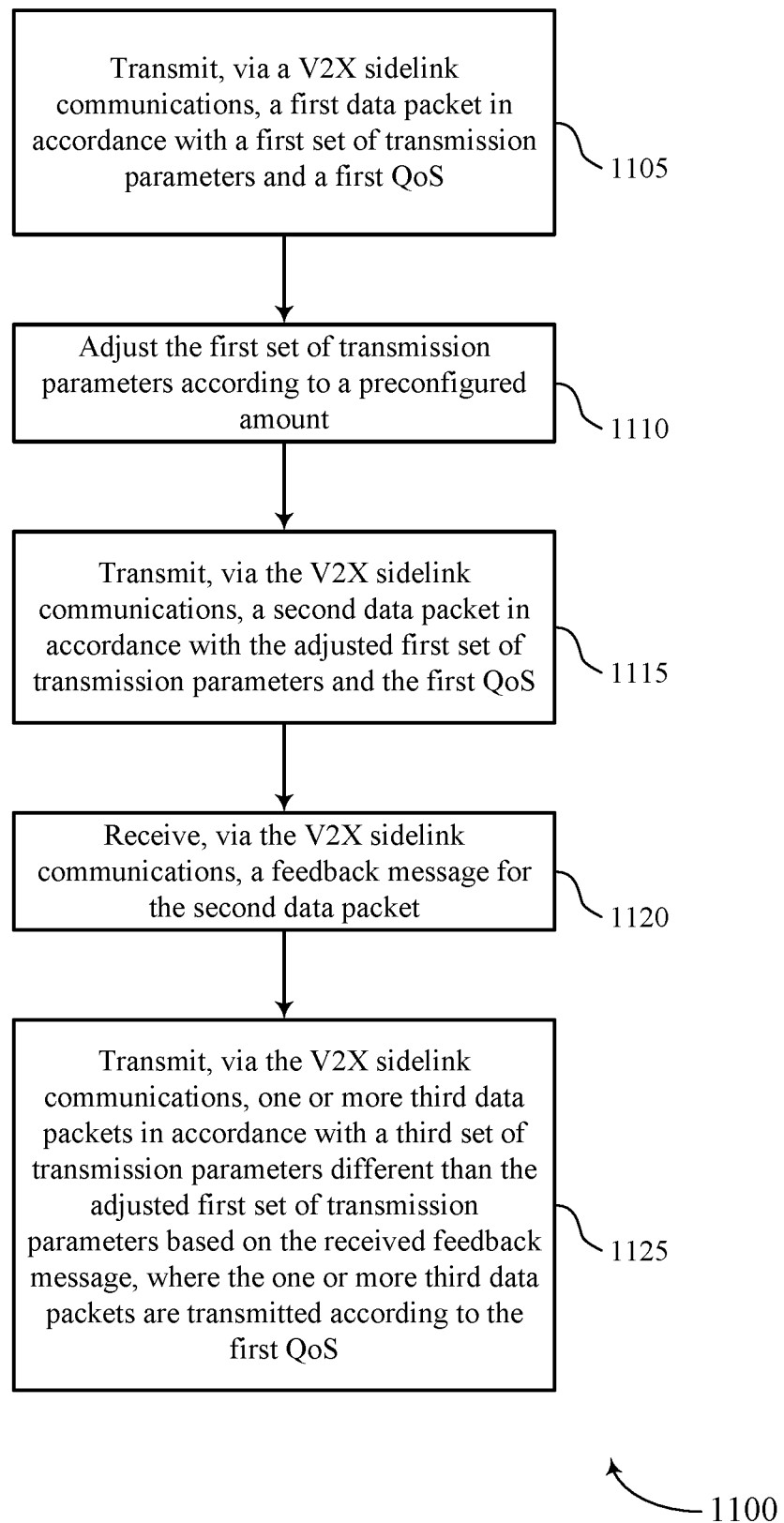

FIG. 11 shows a flowchart illustrating a method 1100 that supports sidelink link adaptation feedback in accordance with aspects of the present disclosure. The operations of method 1100 may be implemented by a UE 115 or its components as described herein. For example, the operations of method 1100 may be performed by a communications manager as described with reference to FIGS. 6 through 9, where the UE is a transmitting device (e.g., transmitting UE). In some examples, a UE may execute a set of instructions to control the functional elements of the UE to perform the functions described herein. Additionally or alternatively, a UE may perform aspects of the functions described herein using special-purpose hardware.

At 1105, the transmitting device may transmit, via a V2X sidelink communications, a first data packet in accordance with a first set of transmission parameters and a first QoS. The operations of 1105 may be performed according to the methods described herein. In some examples, aspects of the operations of 1105 may be performed by an initial data packet component as described with reference to FIGS. 6 through 9.

At 1110, the transmitting device may adjust the first set of transmission parameters according to a preconfigured amount. The operations of 1110 may be performed according to the methods described herein. In some examples, aspects of the operations of 1110 may be performed by a transmission parameter adjuster as described with reference to FIGS. 6 through 9.

At 1115, the transmitting device may transmit, via the V2X sidelink communications, a second data packet in accordance with the adjusted first set of transmission parameters and the first QoS. The operations of 1115 may be performed according to the methods described herein. In some examples, aspects of the operations of 1115 may be performed by a subsequent data packet component as described with reference to FIGS. 6 through 9.

At 1120, the transmitting device may receive, via the V2X sidelink communications, a feedback message for the second data packet. The operations of 1120 may be performed according to the methods described herein. In some examples, aspects of the operations of 1120 may be performed by a feedback receiver as described with reference to FIGS. 6 through 9.

At 1125, the transmitting device may transmit, via the V2X sidelink communications, one or more third data packets in accordance with a third set of transmission parameters different than the adjusted first set of transmission parameters based on the received feedback message, where the one or more third data packets are transmitted according to the first QoS. The operations of 1125 may be performed according to the methods described herein. In some examples, aspects of the operations of 1125 may be performed by a feedback based data packet transmitter as described with reference to FIGS. 6 through 9.

Figure 12:
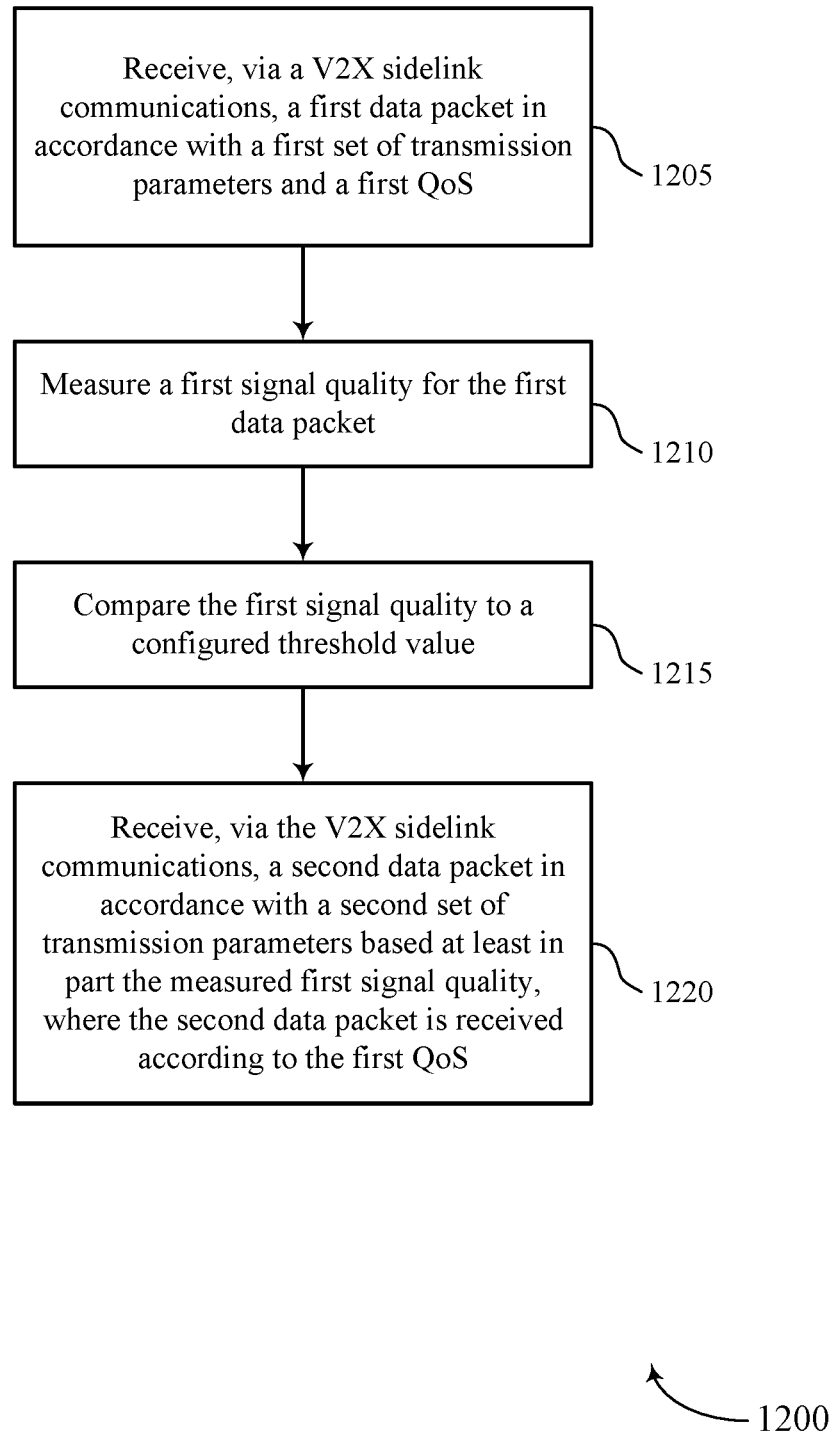

FIG. 12 shows a flowchart illustrating a method 1200 that supports sidelink link adaptation feedback in accordance with aspects of the present disclosure. The operations of method 1200 may be implemented by a UE 115 or its components as described herein. For example, the operations of method 1200 may be performed by a communications manager as described with reference to FIGS. 6 through 9, where the UE is a receiving device (e.g., transmitting UE). In some examples, a UE may execute a set of instructions to control the functional elements of the UE to perform the functions described herein. Additionally or alternatively, a UE may perform aspects of the functions described herein using special-purpose hardware.

At 1205, the receiving device may receive, via a V2X sidelink communications, a first data packet in accordance with a first set of transmission parameters and a first QoS. The operations of 1205 may be performed according to the methods described herein. In some examples, aspects of the operations of 1205 may be performed by an initial data packet component as described with reference to FIGS. 6 through 9.

At 1210, the receiving device may measure a first signal quality for the first data packet. The operations of 1210 may be performed according to the methods described herein. In some examples, aspects of the operations of 1210 may be performed by a signal quality measurement component as described with reference to FIGS. 6 through 9.

At 1215, the receiving device may compare the first signal quality to a configured threshold value. The operations of 1215 may be performed according to the methods described herein. In some examples, aspects of the operations of 1215 may be performed by a signal quality threshold component as described with reference to FIGS. 6 through 9.

At 1220, the receiving device may receive, via the V2X sidelink communications, a second data packet in accordance with a second set of transmission parameters based on the measured first signal quality, where the second data packet is received according to the first QoS. The operations of 1220 may be performed according to the methods described herein. In some examples, aspects of the operations of 1220 may be performed by a subsequent data packet component as described with reference to FIGS. 6 through 9.

Figure 13:
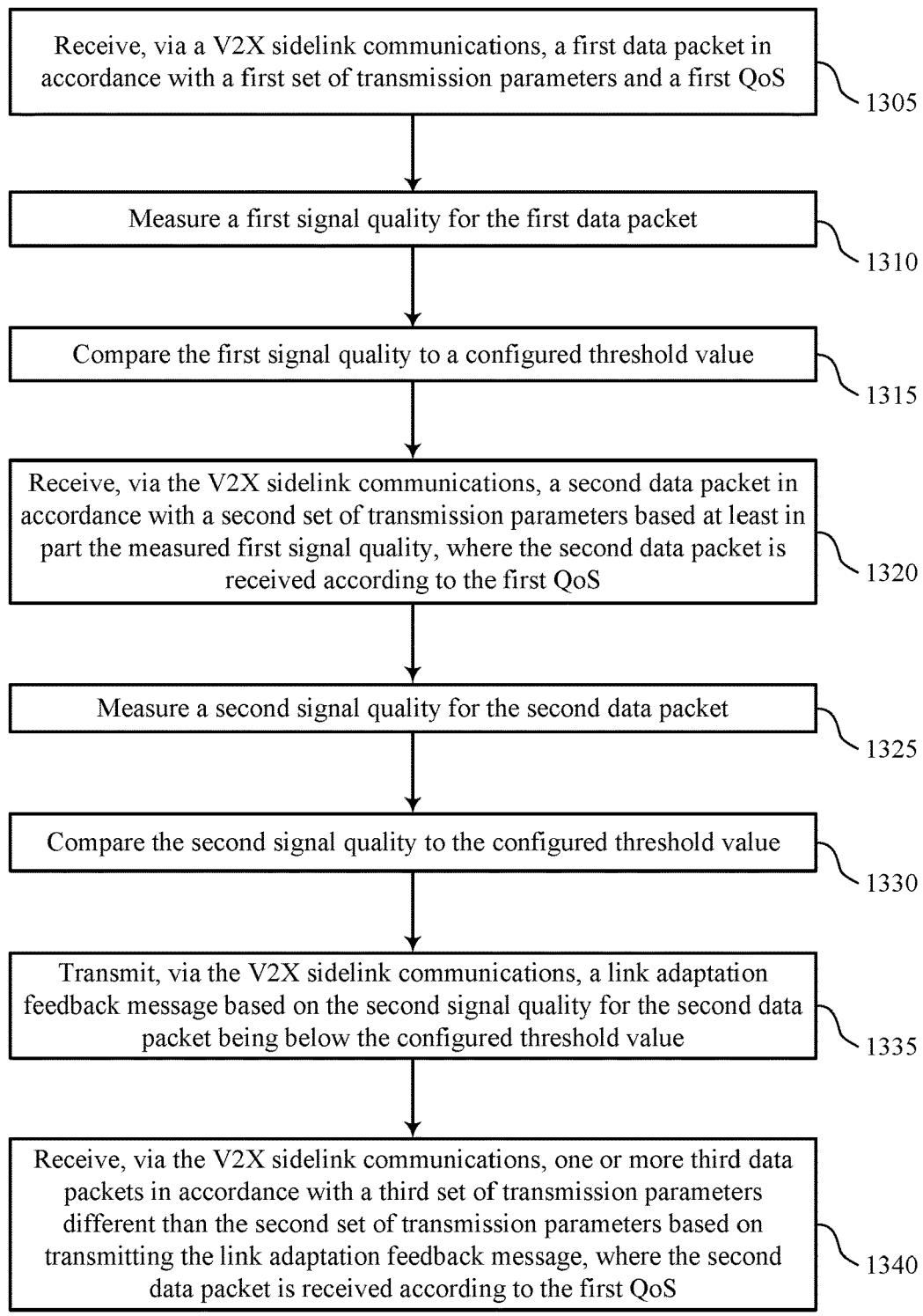

FIG. 13 shows a flowchart illustrating a method 1300 that supports sidelink link adaptation feedback in accordance with aspects of the present disclosure. The operations of method 1300 may be implemented by a UE 115 or its components as described herein. For example, the operations of method 1300 may be performed by a communications manager as described with reference to FIGS. 6 through 9, where the UE is a receiving device (e.g., transmitting UE). In some examples, a UE may execute a set of instructions to control the functional elements of the UE to perform the functions described herein. Additionally or alternatively, a UE may perform aspects of the functions described herein using special-purpose hardware.

At 1305, the receiving device may receive, via a V2X sidelink communications, a first data packet in accordance with a first set of transmission parameters and a first QoS. The operations of 1305 may be performed according to the methods described herein. In some examples, aspects of the operations of 1305 may be performed by an initial data packet component as described with reference to FIGS. 6 through 9.

At 1310, the receiving device may measure a first signal quality for the first data packet. The operations of 1310 may be performed according to the methods described herein. In some examples, aspects of the operations of 1310 may be performed by a signal quality measurement component as described with reference to FIGS. 6 through 9.

At 1315, the receiving device may compare the first signal quality to a configured threshold value. The operations of 1315 may be performed according to the methods described herein. In some examples, aspects of the operations of 1315 may be performed by a signal quality threshold component as described with reference to FIGS. 6 through 9.

At 1320, the receiving device may receive, via the V2X sidelink communications, a second data packet in accordance with a second set of transmission parameters based on the measured first signal quality, where the second data packet is received according to the first QoS. The operations of 1320 may be performed according to the methods described herein. In some examples, aspects of the operations of 1320 may be performed by a subsequent data packet component as described with reference to FIGS. 6 through 9.

At 1325, the receiving device may measure a second signal quality for the second data packet. The operations of 1325 may be performed according to the methods described herein. In some examples, aspects of the operations of 1325 may be performed by a signal quality measurement component as described with reference to FIGS. 6 through 9.

At 1330, the receiving device may compare the second signal quality to the configured threshold value. The operations of 1330 may be performed according to the methods described herein. In some examples, aspects of the operations of 1330 may be performed by a signal quality threshold component as described with reference to FIGS. 6 through 9.

At 1335, the receiving device may transmit, via the V2X sidelink communications, a link adaptation feedback message based on the second signal quality for the second data packet being below the configured threshold value. The operations of 1335 may be performed according to the methods described herein. In some examples, aspects of the operations of 1335 may be performed by a link adaptation feedback component as described with reference to FIGS. 6 through 9.

At 1340, the receiving device may receive, via the V2X sidelink communications, one or more third data packets in accordance with a third set of transmission parameters different than the second set of transmission parameters based on transmitting the link adaptation feedback message, where the second data packet is received according to the first QoS. The operations of 1340 may be performed according to the methods described herein. In some examples, aspects of the operations of 1340 may be performed by a feedback based data packet receiver as described with reference to FIGS. 6 through 9.

Figure 14:
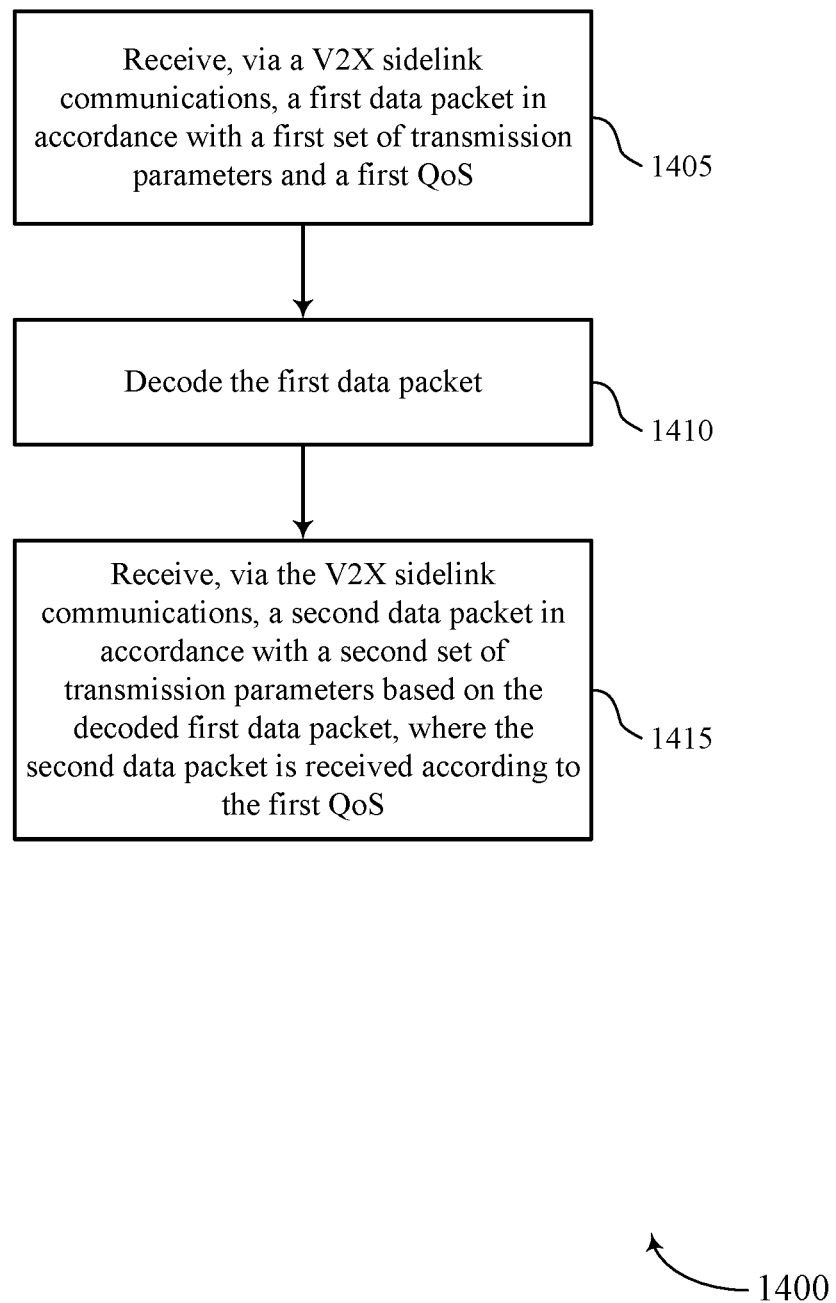

FIG. 14 shows a flowchart illustrating a method 1400 that supports sidelink link adaptation feedback in accordance with aspects of the present disclosure. The operations of method 1400 may be implemented by a UE 115 or its components as described herein. For example, the operations of method 1400 may be performed by a communications manager as described with reference to FIGS. 6 through 9, where the UE is a receiving device (e.g., transmitting UE). In some examples, a UE may execute a set of instructions to control the functional elements of the UE to perform the functions described herein. Additionally or alternatively, a UE may perform aspects of the functions described herein using special-purpose hardware.

At 1405, the receiving device may receive, via a V2X sidelink communications, a first data packet in accordance with a first set of transmission parameters and a first QoS. The operations of 1405 may be performed according to the methods described herein. In some examples, aspects of the operations of 1405 may be performed by an initial data packet component as described with reference to FIGS. 6 through 9.

At 1410, the receiving device may decode the first data packet. The operations of 1410 may be performed according to the methods described herein. In some examples, aspects of the operations of 1410 may be performed by a data packet decoder as described with reference to FIGS. 6 through 9.

At 1415, the receiving device may receive, via the V2X sidelink communications, a second data packet in accordance with a second set of transmission parameters based on the decoded first data packet, where the second data packet is received according to the first QoS. The operations of 1415 may be performed according to the methods described herein. In some examples, aspects of the operations of 1415 may be performed by a subsequent data packet component as described with reference to FIGS. 6 through 9.

Figure 15:
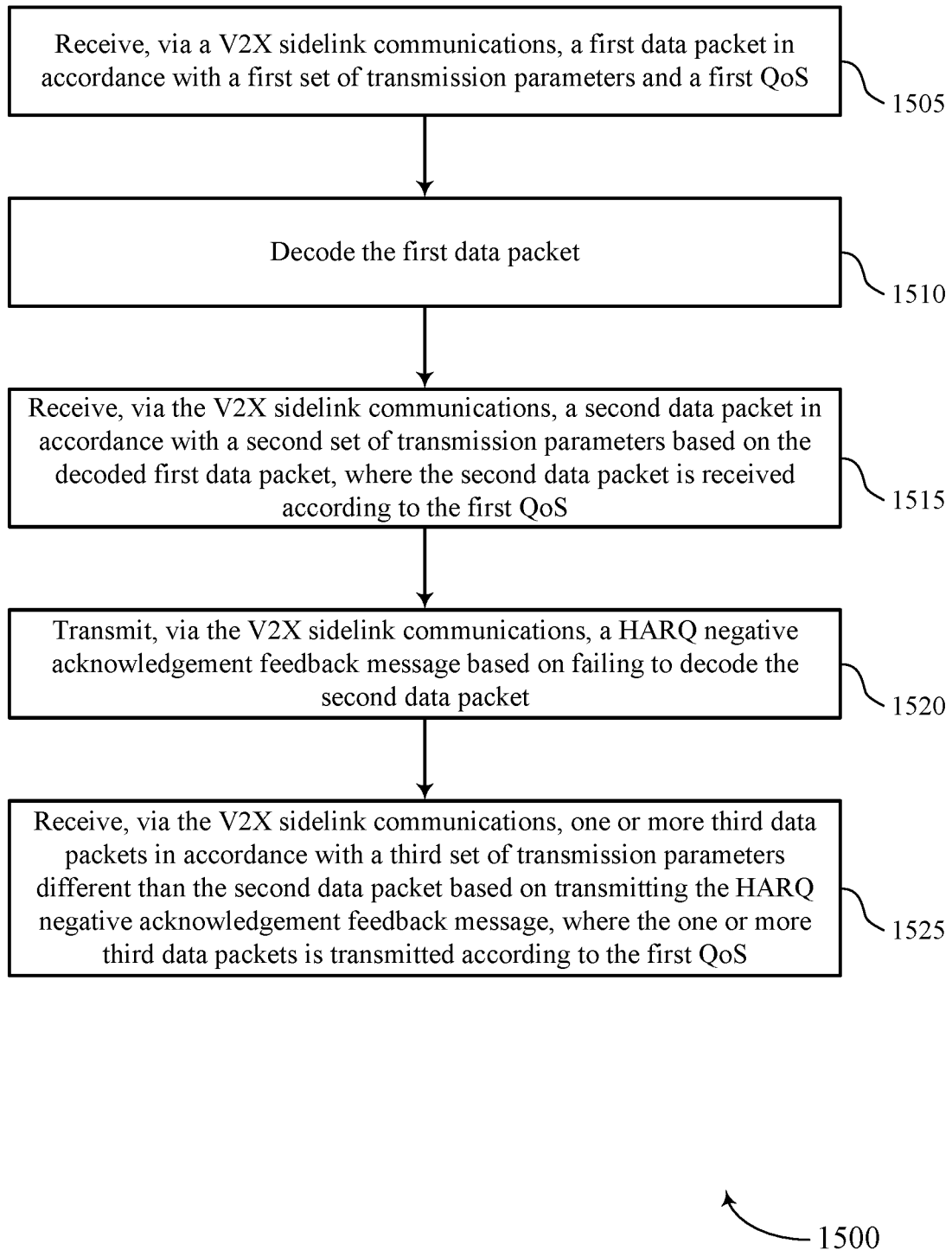

FIG. 15 shows a flowchart illustrating a method 1500 that supports sidelink link adaptation feedback in accordance with aspects of the present disclosure. The operations of method 1500 may be implemented by a UE 115 or its components as described herein. For example, the operations of method 1500 may be performed by a communications manager as described with reference to FIGS. 6 through 9, where the UE is a receiving device (e.g., transmitting UE). In some examples, a UE may execute a set of instructions to control the functional elements of the UE to perform the functions described herein. Additionally or alternatively, a UE may perform aspects of the functions described herein using special-purpose hardware.

At 1505, the receiving device may receive, via a V2X sidelink communications, a first data packet in accordance with a first set of transmission parameters and a first QoS. The operations of 1505 may be performed according to the methods described herein. In some examples, aspects of the operations of 1505 may be performed by an initial data packet component as described with reference to FIGS. 6 through 9.

At 1510, the receiving device may decode the first data packet. The operations of 1510 may be performed according to the methods described herein. In some examples, aspects of the operations of 1510 may be performed by a data packet decoder as described with reference to FIGS. 6 through 9.

At 1515, the receiving device may receive, via the V2X sidelink communications, a second data packet in accordance with a second set of transmission parameters based on the decoded first data packet, where the second data packet is received according to the first QoS. The operations of 1515 may be performed according to the methods described herein. In some examples, aspects of the operations of 1515 may be performed by a subsequent data packet component as described with reference to FIGS. 6 through 9.

At 1520, the receiving device may transmit, via the V2X sidelink communications, a HARQ NACK feedback message based on failing to decode the second data packet. The operations of 1520 may be performed according to the methods described herein. In some examples, aspects of the operations of 1520 may be performed by a HARQ NACK feedback component as described with reference to FIGS. 6 through 9.

At 1525, the receiving device may receive, via the V2X sidelink communications, one or more third data packets in accordance with a third set of transmission parameters different than the second data packet based on transmitting the HARQ negative acknowledgement feedback message, where the one or more third data packets is transmitted according to the first QoS. The operations of 1525 may be performed according to the methods described herein. In some examples, aspects of the operations of 1525 may be performed by a feedback based data packet receiver as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:
   transmitting, via a vehicle-to-everything (V2X) sidelink communications, a first data packet in accordance with a first set of transmission parameters and a first quality of service (QoS);
   adjusting the first set of transmission parameters according to a preconfigured amount; and
   transmitting, via the V2X sidelink communications, a second data packet in accordance with the adjusted first set of transmission parameters and the first QoS.

2. The method of claim 1, further comprising:
   receiving, via the V2X sidelink communications, a feedback message for the second data packet; and transmitting, via the V2X sidelink communications, one or more third data packets in accordance with a third set of transmission parameters different than the adjusted first set of transmission parameters based at least in part on the received feedback message, wherein the one or more third data packets are transmitted according to the first QoS.

3. The method of claim 2, wherein receiving the feedback message comprises:
receiving, via the V2X sidelink communications, a link adaptation feedback message indicating a measured signal quality of the second data packet is below a threshold value.

4. The method of claim 3, wherein the measured signal quality is a signal-to-interference-plus-noise ratio or a reference signal received power measurement.

5. The method of claim 3, wherein the threshold value is based at least in part on one or more of the first QoS or a channel busy ratio for the first data packet.

6. The method of claim 2, wherein receiving the feedback message comprises:
receiving, via the V2X sidelink communications, a hybrid automatic request (HARM) negative acknowledgement feedback message.

7. The method of claim 6, further comprising:
transmitting, via the V2X sidelink communications, the one or more third data packets in accordance with the third set of transmission parameters for a configured time duration, wherein the third set of transmission parameters comprise one or more same transmission parameters as the first set of transmission parameters.

8. The method of claim 7, wherein the configured time duration is based at least in part on one or more of the first QoS or a channel busy ratio for the first data packet.

9. The method of claim 7, further comprising:
transmitting, via the V2X sidelink communications, an additional data packet in accordance with the first set of transmission parameters after the configured time duration ends.

10. The method of claim 2, wherein the third set of transmission parameters comprise a set of parameters indicated by the feedback message with one or more of a higher transmission power than the adjusted first set of transmission parameters or a lower modulation and coding scheme (MCS) than the adjusted first set of transmission parameters.

11. The method of claim 2, wherein the third set of transmission parameters are a same set of parameters as the first set of transmission parameters.

12. The method of claim 1, further comprising:
receiving, via the V2X sidelink communications, a feedback message for the second data packet;
maintaining a set of transmission parameters for a period of time based at least in part on receiving the feedback message; and
transmitting subsequent data packets at the maintained set of transmission parameters for the period of time.

13. The method of claim 12, wherein maintaining the set of transmission parameters comprises:
suspending adjustment of transmission parameters for the period of time.

14. The method of claim 12, wherein the set of transmission parameters are maintained above one or more of the first set of transmission parameters or the adjusted first set of transmission parameters.

15. The method of claim 1, wherein adjusting the first set of transmission parameters comprises:
reducing a transmission power of the first set of transmission parameters by the preconfigured amount.

16. The method of claim 1, wherein adjusting the first set of transmission parameters comprises:
increasing a modulation and coding scheme (MCS) of the first set of transmission parameters by the preconfigured amount.

17. The method of claim 1, wherein the first set of transmission parameters and the preconfigured amount are based at least in part on one or more of the first QoS or a channel busy ratio for the first data packet.

18. The method of claim 1, wherein the first set of transmission parameters is configured by higher layer signaling.

19. The method of claim 1, wherein the first QoS comprises a first priority level for the first data packet.

20. A method for wireless communications at a receiving device, comprising:
receiving, via a vehicle-to-everything (V2X) sidelink communications, a first data packet in accordance with a first set of transmission parameters and a first quality of service (QoS);
measuring a first signal quality for the first data packet;
comparing the first signal quality to a configured threshold value; and
receiving, via the V2X sidelink communications, a second data packet in accordance with a second set of transmission parameters based on the measured first signal quality, wherein the second data packet is received according to the first QoS.

21. The method of claim 20, further comprising:
measuring a second signal quality for the second data packet;
comparing the second signal quality to the configured threshold value;
transmitting, via the V2X sidelink communications, a link adaptation feedback message based at least in part on the second signal quality for the second data packet being below the configured threshold value; and
receiving, via the V2X sidelink communications, one or more third data packets in accordance with a third set of transmission parameters different than the second set of transmission parameters based at least in part on transmitting the link adaptation feedback message, wherein the second data packet is received according to the first QoS.

22. The method of claim 21, wherein the link adaptation feedback message comprises an indication for a transmitting device to adjust the second set of transmission parameters for transmitting the one or more third data packets in accordance with the third set of transmission parameters.

23. The method of claim 21, wherein measuring the second signal quality for the second data packet further comprises:
determining that the second signal quality for the second data packet is below the configured threshold value for a configured time duration.

24. The method of claim 21, wherein the configured threshold value is based at least in part on one or more of the first QoS or a channel busy ratio for the first data packet.

25. The method of claim 20, further comprising:
measuring a second signal quality for the second data packet;
comparing the second signal quality to the configured threshold value; and
transmitting, via the V2X sidelink communications, a link adaptation feedback message based at least in part on the second signal quality for the second data packet being below the configured threshold value, wherein the link adaptation feedback message comprises an indication to suspend adjustments of transmission parameters for a period of time.

26. The method of claim 20, wherein the second set of transmission parameters comprises one or more of a lower transmission power or a higher modulation and coding scheme (MCS) than the first set of transmission parameters.

27. A method for wireless communications at a receiving device, comprising:
 receiving, via a vehicle-to-everything (V2X) sidelink communications, a first data packet in accordance with a first set of transmission parameters and a first quality of service (QoS);
 decoding the first data packet; and
 receiving, via the V2X sidelink communications, a second data packet in accordance with a second set of transmission parameters based at least in part on the decoded first data packet, wherein the second data packet is received according to the first QoS.

28. The method of claim 27, further comprising:
 transmitting, via the V2X sidelink communications, a hybrid automatic request (HARQ) negative acknowledgement feedback message based at least in part on failing to decode the second data packet; and
 receiving, via the V2X sidelink communications, one or more third data packets in accordance with a third set of transmission parameters different than the second data packet based at least in part on transmitting the HARQ negative acknowledgement feedback message, wherein the one or more third data packets is transmitted according to the first QoS.

29. The method of claim 27, further comprising:
 transmitting, via the V2X sidelink communications, a hybrid automatic request (HARQ) negative acknowledgement feedback message based at least in part on failing to decode the second data packet, wherein the HARQ negative acknowledgement feedback message comprises an indication to suspend adjustments of transmission parameters for a period of time.

30. An apparatus for wireless communications at a transmitting device, comprising:
 a processor,
 memory in electronic communication with the processor; and
 instructions stored in the memory and executable by the processor to cause the apparatus to:
  transmit, via a vehicle-to-everything (V2X) sidelink communications, a first data packet in accordance with a first set of transmission parameters and a first quality of service (QoS);
  adjust the first set of transmission parameters according to a preconfigured amount; and
  transmit, via the V2X sidelink communications, a second data packet in accordance with the adjusted first set of transmission parameters and the first QoS.

* * * * *